United States Patent
Tanaka

(10) Patent No.: US 9,727,948 B2
(45) Date of Patent: Aug. 8, 2017

(54) PIXEL INTERPOLATION DEVICE AND OPERATION CONTROL METHOD

(71) Applicant: FUJIFILM Corporation, Tokyo (JP)

(72) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 14/947,916

(22) Filed: Nov. 20, 2015

(65) Prior Publication Data

US 2016/0080715 A1    Mar. 17, 2016

Related U.S. Application Data

(63) Continuation of application No. PCT/JP2014/062943, filed on May 15, 2014.

(30) Foreign Application Priority Data

May 23, 2013  (JP) .................................. 2013-108577

(51) Int. Cl.
*G06T 3/40*        (2006.01)
*H04N 5/369*     (2011.01)
(Continued)

(52) U.S. Cl.
CPC ........... *G06T 3/4015* (2013.01); *H04N 5/347* (2013.01); *H04N 5/3696* (2013.01); *H04N 9/045* (2013.01); *H04N 9/735* (2013.01)

(58) Field of Classification Search
CPC ........... H04N 9/045; H04N 2209/0045; H04N 2209/047; H01L 27/14621; G06T 3/4007; G06T 3/4015
See application file for complete search history.

(56) References Cited

U.S. PATENT DOCUMENTS 9,007,488 B2 *  4/2015  Li ....................... H04N 5/2355
                                                             348/222.1
2001/0005429 A1  6/2001  Ishiga et al.
(Continued)

FOREIGN PATENT DOCUMENTS

JP    2002-10279 A    1/2002
JP    2006-261789 A   9/2006
(Continued)

OTHER PUBLICATIONS

International Search Report, mailed Aug. 19, 2014, issued in PCT/JP2014/062943.
(Continued)

*Primary Examiner* — Nhan T Tran
*Assistant Examiner* — Chriss Yoder, III
(74) *Attorney, Agent, or Firm* — Birch, Stewart, Kolasch & Birch, LLP

(57) ABSTRACT

The generation of a false color is prevented. In a pixel mixture block, pixels of the same color are mixed. For example, red pixels are mixed to obtain a red mixed pixel and blue pixels are mixed to obtain a blue mixed pixel. Green pixels in an odd-numbered row and pixels in an even-numbered row are separately mixed to obtain a green mixed pixel and a green mixed pixel. A correlation direction in a partial color image 1 is detected from these mixed pixels. Interpolation pixels are generated from the mixed pixels according to the correlation direction such that a false color is not generated.

20 Claims, 19 Drawing Sheets

(51) Int. Cl.
*H04N 9/73* (2006.01)
*H04N 5/347* (2011.01)
*H04N 9/04* (2006.01)

(56) References Cited

U.S. PATENT DOCUMENTS

| | | |
|---|---|---|
| 2006/0244841 A1 | 11/2006 | Ikeda |
| 2008/0088725 A1 | 4/2008 | Matsunaga |
| 2012/0293696 A1 | 11/2012 | Tanaka |
| 2013/0140436 A1* | 6/2013 | Nomura ................. H04N 9/045 250/208.1 |
| 2014/0320705 A1* | 10/2014 | Kaizu ................... H04N 9/045 348/246 |

FOREIGN PATENT DOCUMENTS

| | | |
|---|---|---|
| JP | 2008-98971 A | 4/2008 |
| WO | WO 2012/117584 A1 | 9/2012 |

OTHER PUBLICATIONS

Written Opinion of the International Searching Authority, mailed Aug. 19, 2014, issued in PCT/JP2014/062943.
Chinese Office Action and Chinese Search Report, issued Aug. 9, 2016, for Chinese Application No. 201480029601.3, along with an English translation of the Chinse Office Action.

* cited by examiner

//PIXEL INTERPOLATION DEVICE AND OPERATION CONTROL METHOD

CROSS-REFERENCE TO RELATED APPLICATIONS

This application is a Continuation of PCT International Application No. PCT/JP2014/062943 filed on May 15, 2014, which claims priority under 35 U.S.C. §119(a) to Japanese Patent Application No. 2013-108577 filed May 23, 2013. Each of the above application(s) is hereby expressly incorporated by reference, in its entirety, into the present application.

BACKGROUND OF THE INVENTION

1. Field of the Invention

The present invention relates to a pixel interpolation device, a method for controlling an operation of the pixel interpolation device, and a program for controlling the operation of the pixel interpolation device.

2. Description of the Related Art

There is a technique which mixes pixels of the same color in order to generate a reduced image. For example, when pixel mixture is performed for color image data obtained by a solid-state electronic imaging device with a Bayer array, a pixel addition ratio is adjusted such that the centers of gravity of the added pixels are arranged at equal intervals (JP2008-98971A) or the amount of amplification before pixel addition is adjusted such that the centers of gravity of the added pixels are arranged at equal intervals (JP2006-261789A).

SUMMARY OF THE INVENTION

However, in JP2008-98971A and JP2006-261789A, when an object having vertical stripes or horizontal stripes with a high frequency is captured, a false color is generated even though the object is a white-and-black object.

An object of the invention is to prevent the generation of a false color.

A pixel interpolation device according to the invention includes: a same-color pixel mixture device (same-color pixel mixture means) for, in a color image in which a basic array pattern including a pixel of a first color and pixels of second and third colors having a lower contribution to brightness than the pixel of the first color is repeatedly arranged in a row direction and a column direction, mixing the pixels of the first color such that at least a first type of pixels of the first color which are arranged in the same row as the pixel of the second color or the pixel of the third color and a second type of pixels of the first color which are different from the first type of pixels of the first color and are arranged in the same column as the pixel of the second color or the pixel of the third color are separately mixed with each other and for separately mixing the pixels of the second color and the pixels of the third color such that a process of mixing the pixels of the same color is performed for each pixel mixture pattern having a plurality of pixels in the row direction and the column direction, thereby obtaining a plurality of types of mixed pixels of the first color, a mixed pixel of the second color, and a mixed pixel of the third color for each pixel mixture pattern; a correlation determination device (correlation determination means) for determining whether a correlation direction is the column direction or the row direction in the color image, on the basis of the plurality of types of mixed pixels of the first color obtained by the same-color pixel mixture device; and an interpolation device (interpolation means) for generating an interpolation pixel of the first color, an interpolation pixel of the second color, and an interpolation pixel of the third color for each pixel mixture pattern, using the plurality of types of mixed pixels of the first color, the mixed pixel of the second color, and the mixed pixel of the third color obtained by the same-color pixel mixture device, on the basis of the determination result of the correlation determination device.

The invention also provides an operation control method suitable for a pixel interpolation device. That is, this method includes: allowing a same-color pixel mixture device to, in a color image in which a basic array pattern including a pixel of a first color and pixels of second and third colors having a lower contribution to brightness than the pixel of the first color is repeatedly arranged in a row direction and a column direction, mix the pixels of the first color such that at least a first type of pixels of the first color which are arranged in the same row as the pixel of the second color or the pixel of the third color and a second type of pixels of the first color which are different from the first type of pixels of the first color and are arranged in the same column as the pixel of the second color or the pixel of the third color are separately mixed with each other and to separately mix the pixels of the second color and the pixels of the third color such that a process of mixing the pixels of the same color is performed for each pixel mixture pattern having a plurality of pixels in the row direction and the column direction, thereby obtaining a plurality of types of mixed pixels of the first color, a mixed pixel of the second color, and a mixed pixel of the third color for each pixel mixture pattern; allowing a correlation determination device to determine whether a correlation direction is the column direction or the row direction in the color image, on the basis of the plurality of types of mixed pixels of the first color obtained by the same-color pixel mixture device; and allowing an interpolation device to generate an interpolation pixel of the first color, an interpolation pixel of the second color, and an interpolation pixel of the third color for each pixel mixture pattern, using the plurality of types of mixed pixels of the first color, the mixed pixel of the second color, and the mixed pixel of the third color obtained by the same-color pixel mixture device, on the basis of the determination result of the correlation determination device.

The invention also provides a recording medium storing a program for performing a method for controlling an operation of a pixel interpolation device.

According to the invention, the pixels of the first color are mixed such that at least the first type of pixels of the first color which are arranged in the same row as the pixel of the second color or the pixel of the third color and the second type (different from the first type) of pixels of the first color which are arranged in the same column as the pixel of the second color or the pixel of the third color are separately mixed with each other, and the process of mixing the pixels of the same color, that is, the pixels of the second color and the pixels of the third color is performed for each pixel mixture pattern. It is determined whether the correlation direction is the column direction or the row direction in the color image, on the basis of the plurality of types of mixed pixels of the first color, the mixed pixel of the second color, and the mixed pixel of the third color obtained by the pixel mixture. The interpolation pixel of the first color, the interpolation pixel of the second color, and the interpolation pixel of the third color are generated for each pixel mixture pattern, using the plurality of types of mixed pixels of the first color, the mixed pixel of the second color, and the mixed pixel of the third color, on the basis of the determination result. According to this structure, it is determined whether the correlation direction is the column direction or the row direction in the color image, on the basis of a plurality of types of mixed pixels of the first color and the interpolation pixels are generated on the basis of the determination result. Therefore, it is possible to prevent the generation of a false color due to a high-frequency object when pixel mixture is performed.

When the correlation determination device determines that the correlation direction is the column direction in the color image, the interpolation device may reduce the influence of the pixel of the first color, which is arranged in the same row as the pixel of the second color, on the pixel of the second color and reduce the influence of the pixel of the first color, which is arranged in the same row as the pixel of the third color, on the pixel of the third color. When the correlation determination device determines that the correlation direction is the row direction in the color image, the interpolation device may reduce the influence of the pixel of the first color, which is arranged in the same column as the pixel of the second color, on the pixel of the second color, reduce the influence of the pixel of the first color, which is arranged in the same column as the pixel of the third color, on the pixel of the third color, and generate the interpolation pixel of the first color, the interpolation pixel of the second color, and the interpolation pixel of the third color for each pixel mixture pattern, using the plurality of types of mixed pixels of the first color, the mixed pixel of the second color, and the mixed pixel of the third color obtained by the same-color pixel mixture device.

The interpolation device may include difference data calculation device for calculating difference data for the second color between the mixed pixel of the second color and the mixed pixel of the first color which is present in the correlation direction determined by the correlation determination device among the plurality of types of mixed pixels of the first color and difference data for the third color between the mixed pixel of the third color and the mixed pixel of the first color which is present in the correlation direction determined by the correlation determination device among the plurality of types of mixed pixels of the first color. In this case, an average pixel of the plurality of types of pixels of the first color is the interpolation pixel of the first color, a pixel obtained by adding the difference data for the second color calculated by the difference data calculation device to the interpolation pixel of the first color is the interpolation pixel of the second color, and a pixel obtained by adding the difference data for the third color calculated by the difference data calculation device to the interpolation pixel of the first color is the interpolation pixel of the third color.

The pixel interpolation device may further include added value determination device for determining the larger of a first added value obtained by adding an absolute value of a difference between the mixed pixel of the second color and the mixed pixel of the first color which is arranged in the same column as the second color among the plurality of types of mixed pixels of the first color and an absolute value of a difference between the mixed pixel of the third color and the mixed pixel of the first color which is arranged in the same column as the third color among the plurality of types of mixed pixels of the first color and a second added value obtained by adding an absolute value of a difference between the mixed pixel of the second color and the mixed pixel of the first color which is arranged in the same row as the second color among the plurality of types of mixed pixels of the first color and an absolute value of a difference between the mixed pixel of the third color and the mixed pixel of the first color which is arranged in the same row as the third color among the plurality of types of mixed pixels of the first color. In this case, for example, the correlation determination device determines that the correlation direction is the column direction when the added value determination device determines that the first added value is less than the second added value and determines that the correlation direction is the row direction when the added value determination device determines that the first added value is greater than the second added value.

For example, two types of mixed pixels of the first color are obtained by the same-color pixel mixture device. In addition, it is preferable that the centers of gravity of the plurality of types of mixed pixels of the first color, the mixed pixel of the second color, and the mixed pixel of the third color obtained by the same-color pixel mixture device are located at the same position in the pixel mixture pattern.

The basic array pattern is based on, for example, a Bayer array. In addition, 6×6 pixels may be arranged in the row direction and the column direction. The 6×6 pixels may include the pixel of the first color having a green or magenta color component, the pixel of the second color having a red or cyan color component, and the pixel of the third color having a blue or yellow color component in the row direction and the column direction. The 6×6 pixels may include at least one pixel of the first color in the column direction, the row direction, and an oblique direction and include at least one portion in which two consecutive pixels of the first color are arranged in the column direction, the row direction, and the oblique direction.

In the color image, for example, the pixel of the first color is arranged in the same row and column as the pixel of the second color and is arranged in the same column and row as the pixel of the third color.

The invention may provide an imaging apparatus including the pixel interpolation device.

DESCRIPTION OF THE PREFERRED EMBODIMENTS

Figure 1:
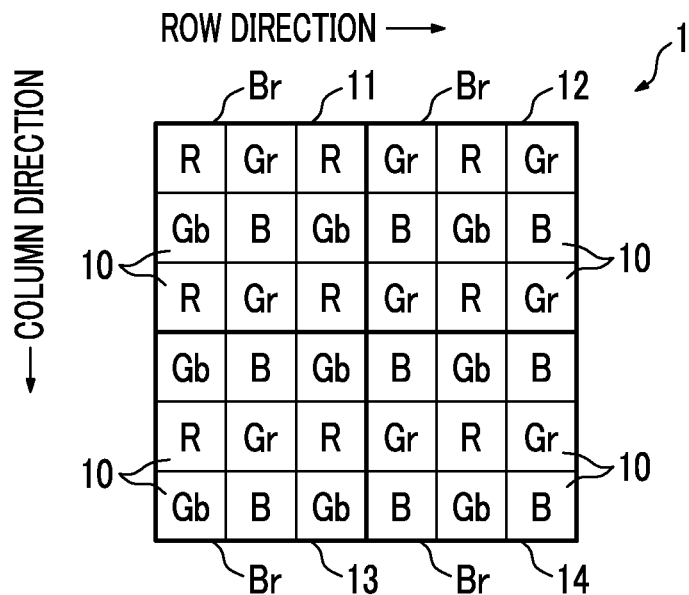
FIG. 1 illustrates an example of a partial color image.

FIG. 1 illustrates a partial color image 1 indicating a portion of a color image obtained by an imaging device in which color filters are arranged in a Bayer array on light receiving surfaces of a plurality of photodiodes.

The partial color image 1 illustrated in FIG. 1 includes six pixels 10 in a row direction (a direction in which the number of rows increases) and six pixels 10 in a column direction (a direction in which the number of columns increases). Red pixels (R pixels or pixels of a second color) that are obtained from signal charges stored in photodiodes having light receiving surfaces on which red filters with characteristics that transmit a red light component are formed are arranged in the odd-numbered columns and the odd-numbered rows. Blue pixels (B pixels or pixels of a third color) that are obtained from signal charges stored in photodiodes having light receiving surfaces on which blue filters with characteristics that transmit a blue light component are formed are arranged in the even-numbered columns and the even-numbered rows. Green pixels (pixels of a first color) that are obtained from signal charges stored in photodiodes having light receiving surfaces on which green filters with characteristics that transmit a green light component are formed are arranged in the even-numbered rows and the odd-numbered columns and the odd-numbered columns and the even-numbered rows. In this embodiment, the green pixel arranged between the R pixels in the odd-numbered row is referred to as a Gr pixel (a first type of pixel of a first color) and the green pixel arranged between the B pixels in the even-numbered row is referred to as a Gb pixel (a second type of pixel of a first color). In FIG. 1, the R pixels may be arranged in the odd-numbered rows and the even-numbered columns, the B pixels may be arranged in the even-numbered rows and the odd-numbered columns, and the green pixels may be arranged in the other columns and rows. The Gb pixel is present in the same row as the B pixel and the Gr pixel is present in the same column as the B pixel. In addition, the Gr pixel is present in the same row as the R pixel and the Gb pixel is present in the same column as the R pixel.

FIG. 1 illustrates the partial color image 1 based on the Bayer array. Therefore, pixels 10 are repeatedly arranged in a basic array pattern of 2 pixels×2 pixels in the column direction and the row direction.

In this embodiment, a pixel mixture block Br (pixel mixture pattern) with a size of 3 pixels×3 pixels in the column direction and the row direction is defined. In the pixel mixture block Br, the pixels of the same color are mixed and a color image is reduced to 1/9, which will be described below. However, the Gr pixel and the Gb pixel are pixels of the same color and are distinguished from each other in pixel mixture. The Gr pixels are mixed with each other and the Gb pixels are mixed with each other in the pixel mixture. In addition, it goes without saying that the pixel mixture block Br is not limited to a size of 3 pixels×3 pixels.

Among image portions defined by four pixel mixture blocks Br with a size of 3 pixels×3 pixels forming the partial color image 1, the upper left image portion, the upper right image portion, the lower left image portion, and the lower right image portion are referred to as image portions 11, 12, 13, and 14, respectively.

FIGS. 2 to 5 illustrate the aspects of pixel mixture in the image portion 11.

Figure 2:
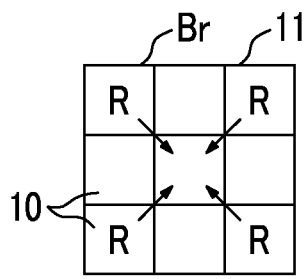
FIG. 2 illustrates an aspect of pixel mixture.

FIG. 2 illustrates the mixture of R pixels forming the image portion 11. In FIG. 2, pixels other than the R pixels are not illustrated for ease of understanding.

In the image portion 11, the pixels 10 arranged at four corners are R pixels. Four R pixels at four corners are mixed and averaged and the averaged pixel is an R mixed pixel (a mixed pixel of the second color) after the image portion 11 is reduced.

Figure 3:
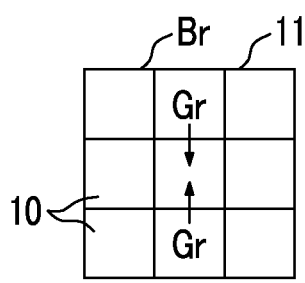
FIG. 3 illustrates an aspect of pixel mixture.

FIG. 3 illustrates the mixture of Gr pixels forming the image portion 11. In FIG. 3, letters indicating the colors of pixels other than the Gr pixels are not illustrated for ease of understanding.

In the image portion 11, the Gr pixels are arranged on the upper and lower sides of the central pixel 10. The two Gr pixels are mixed and averaged and the averaged pixel is a Gr mixed pixel (a mixed pixel of the first color) after the image portion 11 is reduced.

Figure 4:
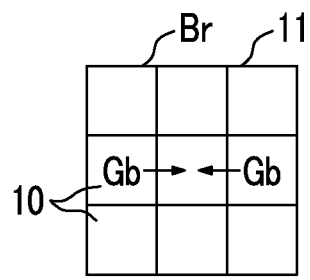
FIG. 4 illustrates an aspect of pixel mixture.

FIG. 4 illustrates the mixture of Gb pixels forming the image portion 11. In FIG. 4, letters indicating the colors of pixels other than the Gb pixels are not illustrated for ease of understanding.

In the image portion 11, the Gb pixels are arranged on the left and right sides of a central pixel. The two Gb pixels are mixed and averaged and the averaged pixel is a Gb mixed pixel (a mixed pixel of the first color) after the image portion 11 is reduced.

Figure 5:
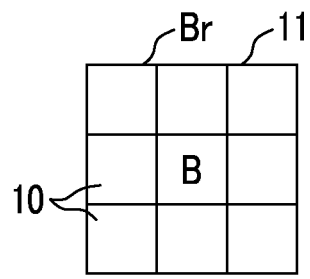
FIG. 5 illustrates an aspect of pixel mixture.

FIG. 5 illustrates a B pixel forming the image portion 11. Since one central B pixel is arranged at the center in the image portion 11, the B pixel becomes a B mixed pixel (a mixed pixel of the third color) after the image portion 11 is reduced. As such, pixel mixture is performed such that, after the pixels of each color are mixed, that is, green pixels, blue pixels, and red pixels are separately mixed, the centers of gravity of the mixed pixels of each color are located at the same pixel position in the pixel mixture block Br. Since image reduction and pixel interpolation are simultaneously performed by the pixel mixture, it is possible to omit an interpolation process (also referred to as demosaic processing) which is generally performed as a separate process, to simplify the structure of a processing circuit, and to increase a processing speed.

FIGS. 6 to 9 illustrate the aspects of pixel mixture in the image portion 12. In FIGS. 6 to 9, similarly to FIGS. 2 to 5, pixels other than the pixels to be mixed are not illustrated.

Figure 6:
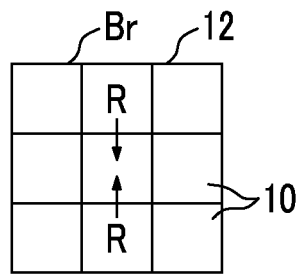
FIG. 6 illustrates an aspect of pixel mixture.

FIG. 6 illustrates the mixture of R pixels in the image portion 12. Since the R pixels are arranged on the upper and lower sides of a central pixel 10, the two R pixels are mixed to generate an R mixed pixel.

Figure 7:
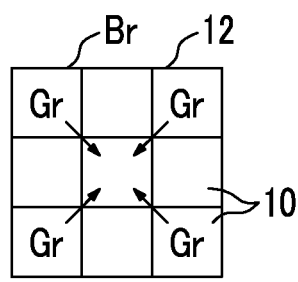
FIG. 7 illustrates an aspect of pixel mixture.

FIG. 7 illustrates the mixture of Gr pixels in the image portion 12. Since the Gr pixels are arranged at four corners, the four Gr pixels are mixed to generate a Gr mixed pixel.

Figure 8:
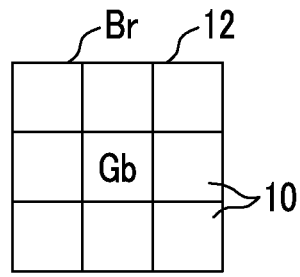
FIG. 8 illustrates an aspect of pixel mixture.

FIG. 8 illustrates a Gb pixel in the image portion 12. The Gb pixel is arranged at the center and becomes a Gb mixed pixel.

Figure 9:
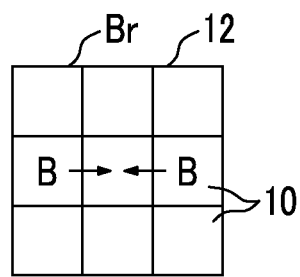
FIG. 9 illustrates an aspect of pixel mixture.

FIG. 9 illustrates B pixels in the image portion 12. Since the B pixels are arranged on the left and right sides of the central pixel 10, the two B pixels are mixed to generate a B mixed pixel.

FIGS. 10 to 13 illustrate the aspects of pixel mixture in the image portion 13. In FIGS. 10 to 13, similarly to the above, pixels other than the pixels to be mixed are not illustrated.

Figure 10:
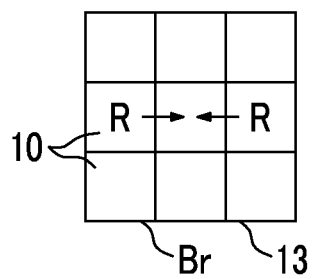
FIG. 10 illustrates an aspect of pixel mixture.

FIG. 10 illustrates the mixture of R pixels in the image portion 13. The R pixels are arranged on the left and right sides of a central pixel 10 and the two R pixels are mixed to generate an R mixed pixel.

Figure 11:
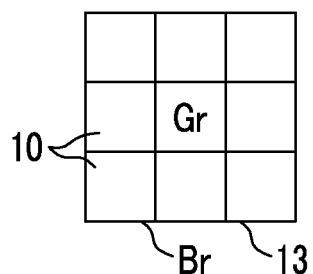
FIG. 11 illustrates an aspect of pixel mixture.

FIG. 11 illustrates a Gr pixel in the image portion 13. Since the Gr pixel is arranged at the center, the Gr pixel becomes a Gr mixed pixel.

Figure 12:
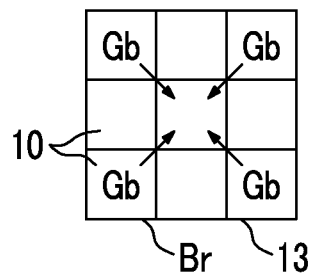
FIG. 12 illustrates an aspect of pixel mixture.

FIG. 12 illustrates the mixture of Gb pixels in the image portion 13. The Gb pixels at four corners of the image portion 13 are mixed to generate a Gb mixed pixel.

Figure 13:
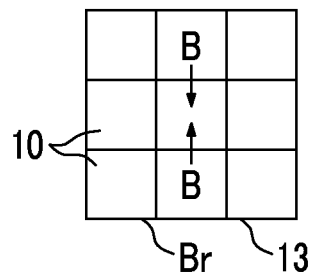
FIG. 13 illustrates an aspect of pixel mixture.

FIG. 13 illustrates the mixture of B pixels in the image portion 13. The B pixels which are arranged on the upper and lower sides of the central pixel in the image portion 13 are mixed to generate a B mixed pixel.

FIGS. 14 to 17 illustrate the aspects of pixel mixture in the image portion 14. In FIGS. 14 to 17, similarly to the above, pixels other than the pixels to be mixed are not illustrated.

Figure 14:
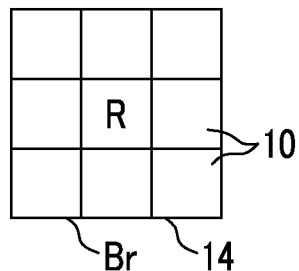
FIG. 14 illustrates an aspect of pixel mixture.

FIG. 14 illustrates an R pixel in the image portion 14. Since the R pixel is arranged at the center, the R pixel becomes an R mixed pixel.

Figure 15:
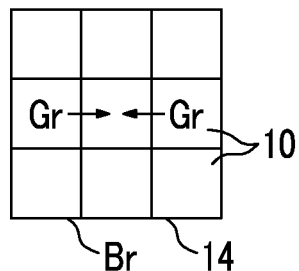
FIG. 15 illustrates an aspect of pixel mixture.
Figure 16:
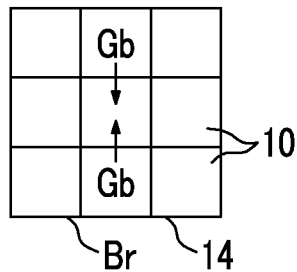
FIG. 16 illustrates an aspect of pixel mixture.

FIG. 15 illustrates Gr pixels in the image portion 14. Since the Gr pixels are arranged on the left and right sides of a central pixel 10, the two Gr pixels are mixed into a Gr mixed pixel. FIG. 16 illustrates Gb pixels in the image portion 14. Since the Gb pixels are arranged on the up and down sides of a central pixel 10, the two Gb pixels are mixed into a Gb mixed pixel.

Figure 17:
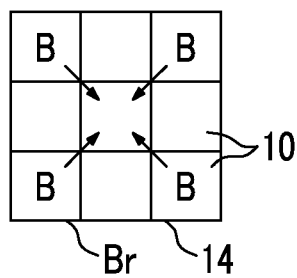
FIG. 17 illustrates an aspect of pixel mixture.

FIG. 17 illustrates B pixels in the image portion 14. Since the B pixels are arranged at four corners, the four B pixels are mixed into a B mixed pixel.

Figure 18:
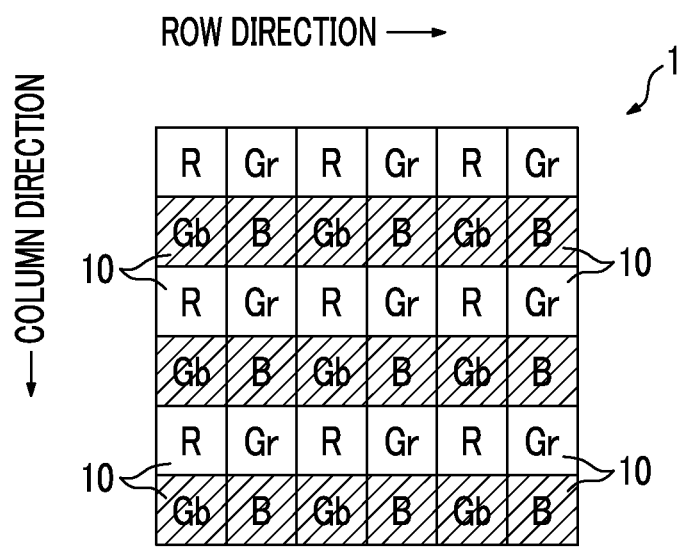
FIG. 18 illustrates a partial color image of horizontal stripes.

FIG. 18 illustrates a partial color image 1 of horizontal stripes.

In an example of an object having a high spatial frequency, it is assumed that the object is white and black horizontal stripes and the cycle of white and black is equal to the interval at which the photodiodes are formed in the imaging device. In this case, as illustrated in FIG. 18, the odd-numbered rows (or the even-numbered rows) are white lines and the even-numbered rows (or the odd-numbered rows) are black lines. In the partial color image 1, the black line is hatched for ease of understanding. A portion which is not hatched indicates the white line.

In the partial color image 1 of white and black horizontal stripes illustrated in FIG. 18, when pixel mixture is performed as described above, a false color is likely to be generated, which will be described below.

First, it is assumed that the level of white is 100 and the level of black is 0. As illustrated in FIG. 2, since the R pixel of the image portion 11 indicates white, the level of the R mixed pixel is 100. Similarly, as illustrated in FIG. 3, since the Gr pixel indicates white, the level of the Gr mixed pixel is 100. As illustrated in FIGS. 4 and 5, since the Gb pixel and the B pixel each indicate black, the level of each of the Gb mixed pixel and the B mixed pixel is 0. Here, the Gr mixed pixel and the Gb mixed pixel are obtained from the characteristics of the same color filter. Therefore, when the Gr mixed pixel and the Gb mixed pixel are mixed with each other, the level of the G pixel after the mixture is 50 and a false color is generated in the reduced image after pixel mixture. This holds for portions other than the image portion 11.

Figure 19:
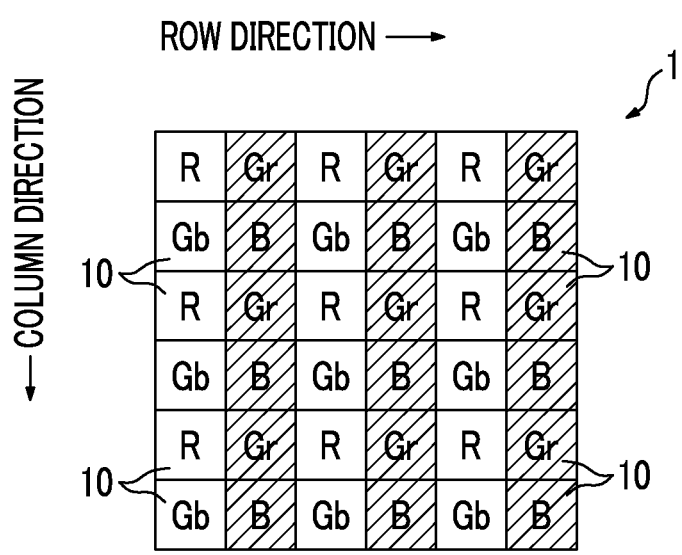
FIG. 19 illustrates a partial color image of vertical stripes.

FIG. 19 illustrates a partial color image 1 of vertical stripes.

Similarly to the partial color image illustrated in FIG. 18, it is assumed that an object is white and black vertical stripes and the cycle of white and black is equal to the interval at which the photodiodes are formed in the imaging device. In this case, as illustrated in FIG. 19, the odd-numbered columns (or the even-numbered columns) are white lines and the even-numbered columns (or the odd-numbered columns) are black lines. In FIG. 18, the black line is hatched for ease of understanding. A portion which is not hatched indicates the white line.

Similarly to the above, it is assumed that the level of white is 100 and the level of black is 0. As illustrated in FIG. 2, since the R pixel of the image portion 11 indicates white, the level of the R mixed pixel is 100. Similarly, as illustrated in FIG. 3, since the Gr pixel indicates black, the level of the Gr mixed pixel is 0. As illustrated in FIG. 4, since the Gb pixel indicates white, the level of the Gb mixed pixel is 100. As illustrated in FIG. 5, since the B pixel indicates black, the level of the B mixed pixel is 0. When the Gr mixed pixel and the Gb mixed pixel are mixed with each other, the level of the G pixel after the mixture is 50 and a false color is generated in the reduced image after pixel mixture. This holds for the image portions other than the image portion 11.

In this embodiment, as illustrated in Expression 1, a correlation direction is determined, using the R mixed pixel, the Gr mixed pixel, the Gb mixed pixel, and the B mixed pixel obtained by pixel mixture.

$$(|R \text{ mixed pixel} - Gr \text{ mixed pixel}| + |B \text{ mixed pixel} - Gb \text{ mixed pixel}|) < (|R \text{ mixed pixel} - Gb \text{ mixed pixel}| + |B \text{ mixed pixel} - Gr \text{ mixed pixel}|) \quad \text{Expression 1}$$

When Expression 1 is established, it is determined that the correlation direction is the horizontal direction (column direction) as in the horizontal stripes illustrated in FIG. 18 in the partial color image 1. When Expression 1 is not established, it is determined that the correlation direction is the vertical direction (row direction) as in the vertical stripes illustrated in FIG. 19 in the partial color image 1. The left side of the sign of inequality in Expression 1 indicates a difference value of a mixed pixel generated from the pixels in the same row and the right side of the sign of inequality in Expression 1 indicates a difference value of a mixed pixel generated from the pixels in the same columns. Therefore, the establishment of Expression 1 means that the level difference between the pixels in the same row is small and the correlation direction is the horizontal direction. Similarly, the non-establishment of Expression 1 means that the level difference between the pixels in the same column is small and the correlation direction is the vertical direction.

In this embodiment, the mixed pixel is corrected according to the correlation direction. In order to correct the mixed pixel, an R pixel difference value Rsub and a B pixel difference value Bsub are calculated. When it is determined that the correlation direction is the horizontal direction (column direction), the R pixel difference value Rsub and the B pixel difference value Bsub are represented by Expression 3 and Expression 4, respectively. When the correlation direction is the horizontal direction, the influence of the Gr pixel in the same row as the R pixel and the influence of the Gb pixel in the same row as the B pixel are reduced, which will be described below.

$R$ pixel difference value $R$sub=$R$ mixed pixel−$Gr$ mixed pixel     Expression 3

$B$ pixel difference value $B$sub=$B$ mixed pixel−$Gb$ mixed pixel     Expression 4

When it is determined that the correlation direction is the vertical direction, the R pixel difference value Rsub and the B pixel difference value Bsub are represented by Expression 5 and Expression 6, respectively. When the correlation direction is the vertical direction (row direction), the influence of the Gb pixel in the same column as the R pixel and the influence of the Gr pixel in the same column as the B pixel are reduced, which will be described below.

$R$ pixel difference value $R$sub=$R$ mixed pixel−$Gb$ mixed pixel     Expression 5

$B$ pixel difference value $B$sub=$B$ mixed pixel−$Gr$ mixed pixel     Expression 6

The following interpolation pixels are generated from, for example, the above-mentioned mixed pixels.

$G$ interpolation pixel=($Gr$ mixed pixel+$Gb$ mixed pixel)/2     Expression 7

$R$ interpolation pixel=$G$ interpolation pixel+$R$ pixel difference value $R$sub     Expression 8

$B$ interpolation pixel=$G$ interpolation pixel+$B$ pixel difference value $B$sub     Expression 9

A reduced image is generated using the interpolation pixels obtained by Expressions 7 to 9. Therefore, as described above, even in a monochrome image of horizontal stripes or vertical stripes with a high frequency, it is possible to perform a reduction and interpolation process, without generating a false color.

For example, as illustrated in FIG. 18, when the reduction and interpolation process is performed for the partial color image 1 of white and black horizontal stripes, Expression 1 is established for the image portion 11. Therefore, the R pixel difference value Rsub is 100−100=0 from Expression 3 and the B pixel difference value Bsub is 0−0=0 from Expression 4. The level of G interpolation pixel is (100+0)/2=50 from Expression 7, the level of R interpolation pixel is 50+0=50 from Expression 8, and the level of B interpolation pixel is 50+0=50 from Expression 9. The level of G interpolation pixel=the level of R interpolation pixel=the level of B interpolation pixel=50 is established and the generation of a false color is prevented. This holds for the other image portions 12, 13, and 14.

As illustrated in FIG. 19, when the reduction and interpolation process is performed for the partial color image 1 of white and black vertical stripes, Expression 1 is not established for the image portion 11. Therefore, the R pixel difference value Rsub is 100−100=0 from Expression 5 and the B pixel difference value Bsub is 0−0=0 from Expression 6. The G interpolation pixel=the R interpolation pixel=the B interpolation pixel=50 is established and the generation of a false color is prevented. This holds for the other image portions 12, 13, and 14.

Figure 20:
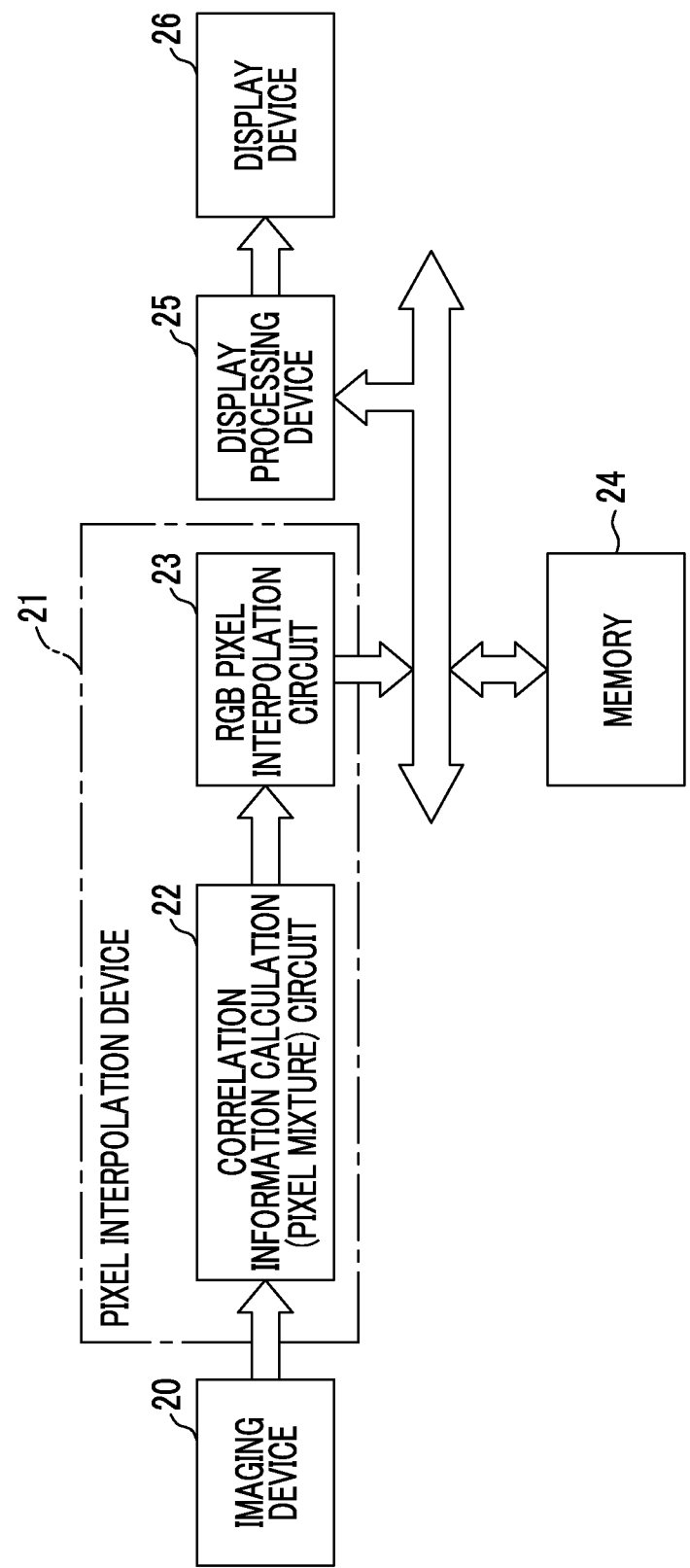
FIG. 20 illustrates the electrical structure of a digital camera.

FIG. 20 is a block diagram illustrating the electrical structure of a digital camera which performs the reduction and interpolation process.

An imaging device 20 has the above-mentioned Bayer array and outputs color image data (RAW data) indicating a color image including the above-mentioned partial color image 1. The color image data output from the imaging device 20 is transmitted to a correlation information calculation circuit 22 forming a pixel interpolation device 21. The correlation information calculation circuit 22 performs the above-mentioned pixel mixture to generate the R mixed pixel, the B mixed pixel, the Gr mixed pixel, and the Gb mixed pixel. The correlation information calculation circuit 22 calculates correlation information indicating the correlation direction of the color image from Expression 1, using the mixed pixels.

The correlation information calculation circuit 22 outputs data indicating each of the R mixed pixel, the B mixed pixel, the Gr mixed pixel, and the Gb mixed pixel and data indicating the correlation information to an RGB pixel interpolation circuit 23. The RGB pixel interpolation circuit 23 calculates the pixel difference values represented by Expressions 3 and 4 or Expressions 5 and 6, according to the correlation direction, and generates the interpolation pixels on the basis of Expressions 7 to 9. Data indicating the generated interpolation pixels is transmitted to a display processing device 25 through a memory 24. The display processing device 25 controls a display device 26 such that a reduced image subjected to the interpolation process is displayed. It goes without saying that no false color is generated in the image displayed on the display device 26.

In this embodiment, the correlation information calculation circuit 22 performs pixel mixture to generate the R mixed pixel, the B mixed pixel, the Gr mixed pixel, and the Gb mixed pixel. However, the invention is not limited thereto. The pixel mixture may be performed in a stage in which color image data is read from the imaging device 20 or in a stage in which color image data is output from the imaging device 20. In this case, it is possible to increase a processing speed.

FIGS. 21 to 29 illustrate another embodiment.

Figure 21:
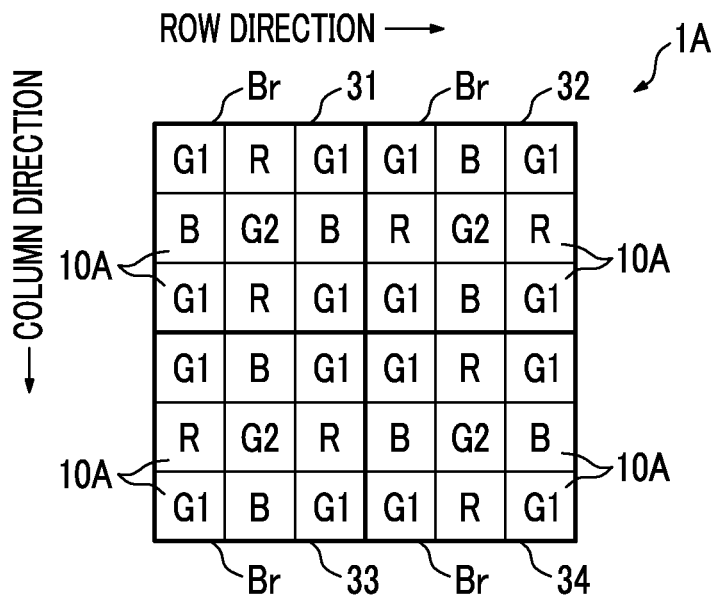
FIG. 21 illustrates an example of a partial color image.

FIG. 21 corresponds to FIG. 1 and illustrates a partial color image 1A which is a portion of a color image obtained by an imaging device in which color filters are arranged in a predetermined array on light receiving surfaces of a plurality of photodiodes.

The partial color image 1A illustrated in FIG. 21 includes six pixels 10A in a row direction and six pixels 10A in a column direction. Similarly to the above, among the pixels 10A, a red pixel, a green pixel, and a blue pixel are represented by letters R, G, and B, respectively.

In a pixel mixture block Br with a size of 3 pixels×3 pixels, G pixels are arranged at the center and four corners. In this embodiment, in the pixel mixture block Br, the G pixel at the center is distinguished from the G pixels at four corners. The G pixels at four corners are G1 pixels and the G pixel at the center is a G2 pixel. In image portions 31 and 34 defined by pixel mixture blocks Br which are arranged on the upper left side and the lower right side of the partial color image 1A, R pixels are arranged on the upper and lower sides of a central G2 pixel and B pixels are arranged on the left and right sides of the central G2 pixel. In contrast, in image portions 32 and 33 defined by pixel mixture blocks Br which are arranged on the upper right side and the lower left side of the partial color image 1A, B pixels are arranged on the upper and lower sides of a central G2 pixel and R pixels are arranged on the left and right sides of the central G2 pixel.

The partial color image 1A illustrated in FIG. 21 is repeated as a basic array pattern to form a color image.

In the partial color image 1A, at least one G1 pixel or G2 pixel, at least one R pixel, and at least one B pixel are arranged in the horizontal direction (column direction) and the vertical direction (row direction). The partial color image 1A is repeatedly arranged to form a color image in which at least one G1 pixel or G2 pixel is arranged in the horizontal direction, the vertical direction, and the oblique direction. The partial color image 1A includes at least one portion having two consecutive G1 pixels or G2 pixels in the horizontal direction, the vertical direction, and the oblique direction. In addition, the partial color image 1A includes at least one portion having two consecutive G1 pixels in the horizontal direction and the vertical direction.

For example, in the partial color image 1A, the G1 pixels are formed in a (6m (m is a positive integer)+1)-th column, a (6m+3)-th column, a (6m+4)-th column, and a (6m+6)-th column in a (6n (n is a positive integer)+1)-th row, a (6n+3)-th row, a (6n+4)-th row, and a (6n+6)-th row. In addition, the G2 pixels are formed in a (6m+2)-th column and a (6m+5)-th column in a (6n+2)-th row and a (6n+5)-th row. Similarly, the B pixels are formed in the (6m+5)-th column in the (6n+1)-th row and the (6n+3)-th row, are formed in the (6m+1)-th column and the (6m+3)-th column in the (6n+2)-th row, are formed in the (6m+2)-th column in the (6n+4)-th row and the (6n+6)-th row, and are formed in the (6m+4)-th column and the (6m+6)-th column in the (6n+5)-th row. The R pixels are formed in the (6m+2)-th column in the (6n+1)-th and (6n+3)-th row, are formed in the (6m+4)-th column and the (6m+6)-th column in the (6n+2)-th row, are formed in the (6m+5)-th column in the (6n+4)-th row and the (6n+6)-th row, and are formed in the (6m+1)-th column and the (6m+3)-th column in the (6n+5)-th row.

In the above-mentioned example, the red filter, the green filter, or the blue filter is formed on the light receiving surface of the photodiode, which is a photoelectric conversion element, to obtain a color image. However, a cyan filter having characteristics that transmit a light component of cyan C, a magenta filter having characteristics that transmit a light component of magenta M, or a yellow filter having characteristics that transmit a light component of yellow Y may be formed on the light receiving surface of the photodiode, which is a photoelectric conversion element, to obtain a color image having the above-mentioned pixel array. Here, the cyan C, the magenta M, and the yellow Y are complementary colors of three primary colors.

FIGS. 22 to 25 illustrate the aspects of pixel mixture in the image portion 31. The aspects of pixel mixture are similarly applied to the image portion 34.

Figure 22:
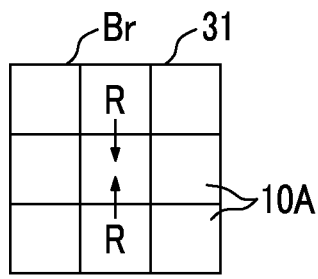
FIG. 22 illustrates an aspect of pixel mixture.

FIG. 22 illustrates the mixture of R pixels. For ease of understanding, pixels other than the R pixel are not illustrated in FIG. 22. In the image portion 31, the R pixels are arranged on the upper and lower sides of a central pixel 10A. The two R pixels are mixed and averaged and the averaged pixel is an R mixed pixel after the image portion 31 is reduced.

Figure 23:
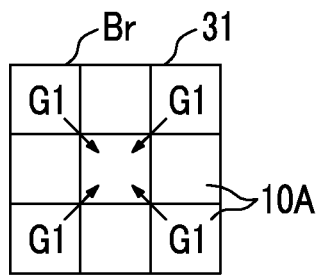
FIG. 23 illustrates an aspect of pixel mixture.

FIG. 23 illustrates the mixture of G1 pixels forming the image portion 31. In FIG. 23, letters indicating the colors of pixels other than the G1 pixels are not illustrated.

In the image portion 31, the G1 pixels are arranged at four corners. The four G1 pixels are mixed and averaged and the averaged pixel is a G1 mixed pixel after the image portion 31 is reduced.

Figure 24:
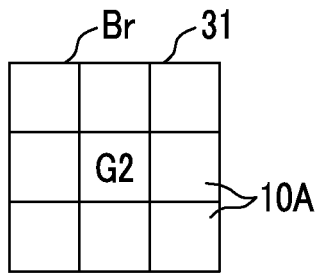
FIG. 24 illustrates an aspect of pixel mixture.

FIG. 24 illustrates the mixture of G2 pixels forming the image portion 31. In FIG. 24, letters indicating the colors of pixels other than the G2 pixels are not illustrated for ease of understanding.

In the image portion 31, a central pixel is the G2 pixel. The G2 pixel is a G2 mixed pixel after the image portion 31 is reduced.

Figure 25:
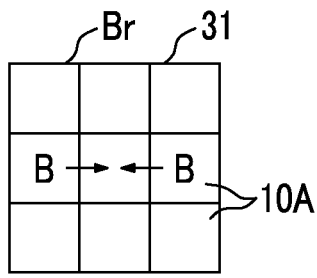
FIG. 25 illustrates an aspect of pixel mixture.

FIG. 25 illustrates B pixels forming the image portion 31. In FIG. 25, letters indicating the colors of pixels other than the B pixels are not illustrated.

The B pixels are arranged on the left and right sides of a central pixel 10A. The two B pixels are mixed and averaged and the average pixel is a B mixed pixel after the image portion 31 is reduced.

Figure 26:
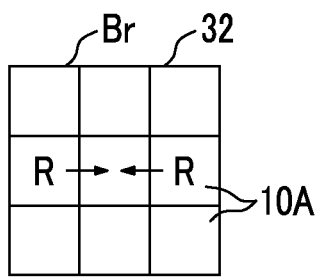
FIG. 26 illustrates an aspect of pixel mixture.
Figure 27:
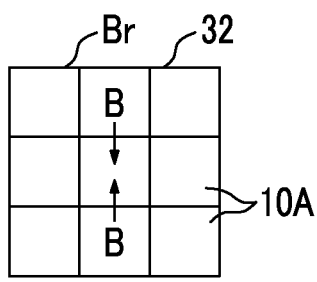
FIG. 27 illustrates an aspect of pixel mixture.

FIGS. 26 and 27 illustrate the aspects of pixel mixture in the image portion 32. The aspects of pixel mixture are similarly applied to the image portion 33. Since the arrangement of the G1 pixels and the arrangement of the G2 pixels in the image portions 32 and 33 are the same as those in the image portion 31, the mixture of the G1 pixels is the same as that illustrated in FIG. 23 and the mixture of the G2 pixels is the same as that illustrated in FIG. 24.

FIG. 26 illustrates the mixture of R pixels. Since the R pixels are arranged on the left and right sides of a central pixel 10A, the two R pixels are mixed to generate an R mixed pixel. It goes without saying that the two R pixels are averaged.

FIG. 27 illustrates the mixture of B pixels. Since the B pixels are arranged on the upper and lower sides of a central pixel 10A, the two B pixels are mixed to generate a B mixed pixel. As such, pixel mixture is performed such that, after the pixels of each color are mixed, that is, green pixels, blue pixels, and red pixels are separately mixed, the centers of gravity of the mixed pixels of each color are located at the same pixel position. Since image reduction and pixel interpolation are simultaneously performed by the pixel mixture, it is possible to omit an interpolation process (also referred to as demosaic processing) which is generally performed as a separate process, to simplify the structure of a processing circuit, and to increase a processing speed.

Figure 28:
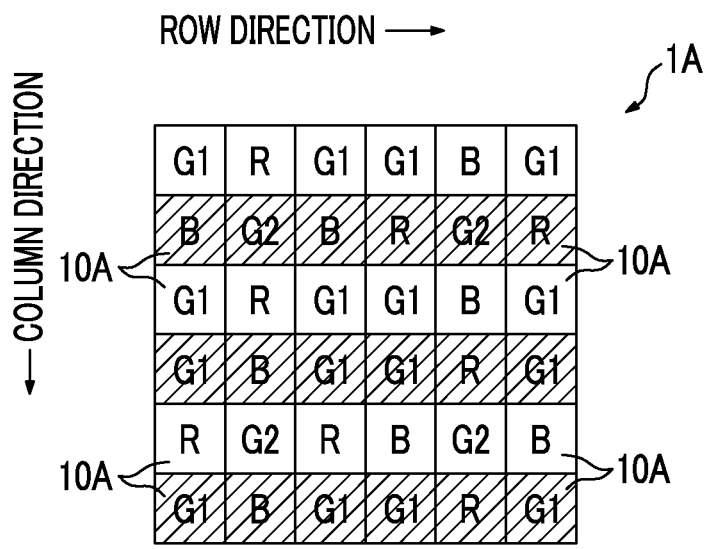
FIG. 28 illustrates a partial color image of horizontal stripes.

FIG. 28 corresponds to FIG. 18 and illustrates a partial color image 1A of horizontal stripes.

Similarly to the partial color image illustrated in FIG. 18, it is assumed that an object is white and black horizontal stripes and the cycle of white and black is equal to the interval at which the photodiodes are formed in the imaging device. In this case, as illustrated in FIG. 28, the odd-numbered rows (or the even-numbered rows) are white lines and the even-numbered rows (or the odd-numbered rows) are black lines. In the partial color image 1A, the black line is hatched for ease of understanding. A portion which is not hatched indicates the white line.

Similarly to the description with reference to FIG. 18, when a G1 pixel and a G2 pixel are mixed without being distinguished from each other, a false color is generated.

Figure 29:
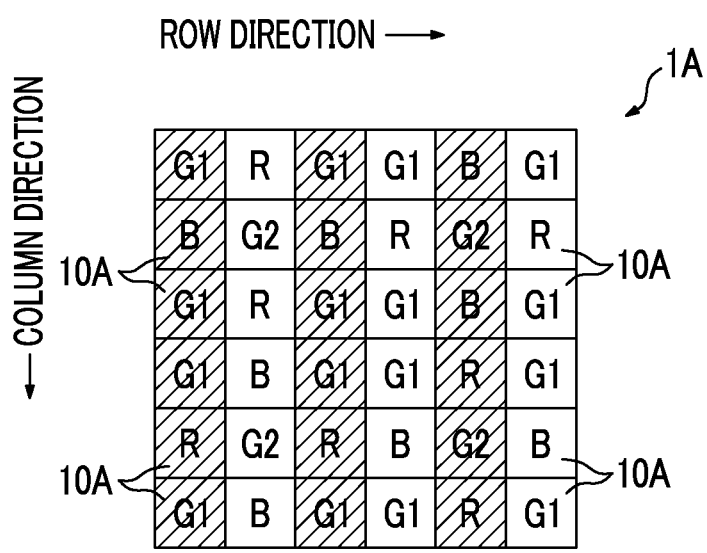
FIG. 29 illustrates a partial color image of vertical stripes.

FIG. 29 illustrates a partial color image 1A of vertical stripes.

Similarly to the partial color image illustrated in FIG. 28, it is assumed that an object is white and black vertical stripes and the cycle of white and black is equal to the interval at which the photodiodes are formed in the imaging device. In this case, as illustrated in FIG. 29, the odd-numbered columns (or the even-numbered columns) are white lines and the even-numbered columns (or the odd-numbered columns) are black lines. In FIG. 29, the black line is hatched for ease of understanding. A portion which is not hatched indicates the white line.

In this embodiment, similarly to the above, in the pixel array patterns of the image portions 31 and 34, as illustrated in Expression 10, a correlation direction is determined, using an R mixed pixel, a G1 mixed pixel, a G2 mixed pixel, and a B mixed pixel obtained by pixel mixture.

(|R mixed pixel−G1 mixed pixel|+|B mixed pixel−G2 mixed pixel|)<(|R mixed pixel−G2 mixed pixel|+|B mixed pixel−G1 mixed pixel|)  Expression 10

When Expression 10 is established, it is determined that the correlation direction is the horizontal direction (column direction) in the image portions 31 and 34, as in the horizontal stripes illustrated in FIG. 28. When Expression 10 is not established, it is determined that the correlation direction is the vertical direction (row direction) in the image portions 31 and 34, as in the vertical stripes illustrated in FIG. 29.

In the pixel array patterns of the image portions 32 and 33, the correlation direction is determined, using Expression 10A in which the R mixed pixel and the B mixed pixel are reverse to those in Expression 10.

(|B mixed pixel−G1 mixed pixel|+|R mixed pixel−G2 mixed pixel|)<(|B mixed pixel−G2 mixed pixel|+|R mixed pixel−G1 mixed pixel|)  Expression 10A When Expression 10A is established, it is determined that the correlation direction is the horizontal direction in the image portions 32 and 33, as in the horizontal stripes illustrated in FIG. 28. When Expression 10A is not established, it is determined that the correlation direction is the vertical direction in the image portions 32 and 33, as in the vertical stripes illustrated in FIG. 29.

As such, it is determined whether the correlation direction is the column direction or the row direction, on the basis of the comparison between the sum of the absolute value of the difference between the R mixed pixel and the G mixed pixel, which are mixed in the same column, and the absolute value of the difference between the B mixed pixel and the G mixed pixel, which are mixed in the same column, and the sum of the absolute value of the difference between the R mixed pixel and the G mixed pixel, which are mixed in the same row, and the absolute value of the difference between the B mixed pixel and the G mixed pixel, which are mixed in the same row.

Similarly to the above, the mixed pixel is corrected according to the correlation direction. In order to correct the mixed pixel, an R pixel difference value Rsub and a B pixel difference value Bsub are calculated. When it is determined that the correlation direction is the horizontal direction, the R pixel difference value Rsub and the B pixel difference value Bsub are represented by Expression 11 and Expression 12, respectively. When the correlation direction is the horizontal direction, the influence of the G1 pixel in the same row as the R pixel and the influence of the G2 pixel in the same row as the B pixel are reduced, which will be described below.

R pixel difference value Rsub=R mixed pixel−G1 mixed pixel  Expression 11

B pixel difference value Bsub=B mixed pixel−G2 mixed pixel  Expression 12

When it is determined that the correlation direction is the vertical direction, the R pixel difference value Rsub and the B pixel difference value Bsub are represented by Expression 13 and Expression 14, respectively. When the correlation direction is the vertical direction, the influence of the G2 pixel in the same column as the R pixel and the influence of the G1 pixel in the same column as the B pixel are reduced, which will be described below.

R pixel difference value Rsub=R mixed pixel−G2 mixed pixel  Expression 13

B pixel difference value Bsub=B mixed pixel−G1 mixed pixel  Expression 14

The following interpolation pixels are generated from, for example, the above-mentioned mixed pixels.

G interpolation pixel=(G1 mixed pixel+G2 mixed pixel)/2  Expression 15

R interpolation pixel=G interpolation pixel+R pixel difference value Rsub  Expression 16

B interpolation pixel=G interpolation pixel+B pixel difference value Bsub  Expression 17

A reduced image is generated using the interpolation pixels obtained by Expressions 15 to 17. Therefore, as described above, even in a monochrome image of horizontal stripes or vertical stripes with a high frequency, it is possible to perform a reduction and interpolation process, without generating a false color.

For example, as illustrated in FIG. 28, when the reduction and interpolation process is performed for the partial color image 1A of white and black horizontal stripes, Expression 10 is established for the image portion 31. Therefore, the R pixel difference value Rsub is 100−100=0 from Expression 11 and the B pixel difference value Bsub is 0−0=0 from Expression 12. The level of G interpolation pixel is (100+0)/2=50 from Expression 15, the level of R interpolation pixel is 50+0=50 from Expression 16, and the level of B interpolation pixel is 50+0=50 from Expression 17. The level of G interpolation pixel=the level of R interpolation pixel=the level of B interpolation pixel=50 is established and the generation of a false color is prevented.

The determination of the direction, the calculation of the R pixel difference value and the B pixel difference value, and the calculation of the G interpolation pixel, the R interpolation pixel, and the B interpolation pixel are performed for the other image portions 32 and 33 on the basis of Expression 10A. In this way, the generation of a false color is prevented.

As illustrated in FIG. 29, when the reduction and interpolation process is performed for the partial color image 1A of white and black vertical stripes, Expression 10 is not established for the image portion 31. Therefore, the R pixel difference value Rsub is 100−100=0 from Expression 13 and the B pixel difference value Bsub is 0−0=0 from Expression 14. The G interpolation pixel=the R interpolation pixel=the B interpolation pixel=50 is established and the generation of a false color is prevented. This holds for the other image portion 34.

FIGS. 30 to 38 illustrate another embodiment.

Figure 30:
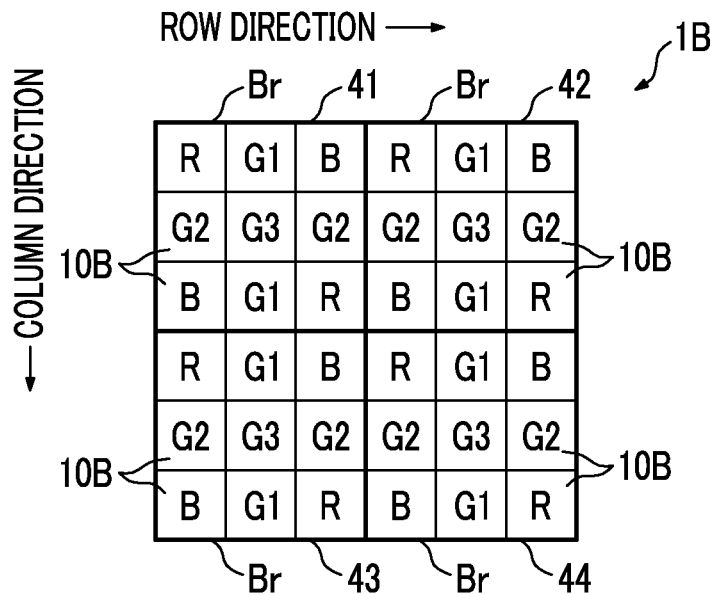
FIG. 30 illustrates an example of a partial color image.

FIG. 30 corresponds to FIGS. 1 and 21 and illustrates a partial color image 1B which is a portion of a color image obtained by an imaging device in which color filters are arranged in a predetermined array on light receiving surfaces of a plurality of photodiodes.

The partial color image 1B illustrated in FIG. 30 includes six pixels 10B in a row direction and six pixels 10B in a column direction. Similarly to the above, among the pixels 10B, a red pixel, a green pixel, and a blue pixel are represented by letters R, G, and B, respectively.

In any of image portions 41 to 44, which are pixel mixture blocks Br each having a size of 3 pixels×3 pixels, G pixels are arranged at the center and on the upper, lower, left and right sides of the center. R pixels are arranged on the upper left side and the lower right side of the center and B pixels are arranged on the upper right side and the lower left side of the center. In this embodiment, the G pixel at the center is distinguished from the G pixels arranged on the upper and lower sides of the central G pixel and the G pixels arranged on the left and right sides of the central G pixel. The G pixels arranged on the upper and lower sides of the central G pixel are G1 pixels, the G pixels arranged on the left and right sides of the central G pixel are G2 pixels, and the central G pixel is a G3 pixel.

The image portion 41 is repeated as a basic array pattern to form a color image.

In the above-mentioned example, the red filter, the green filter, or the blue filter is formed on the light receiving surface of the photodiode, which is a photoelectric conversion element, to obtain a color image. However, a cyan filter having characteristics that transmit a light component of cyan C, a magenta filter having characteristics that transmit a light component of magenta M, or a yellow filter having characteristics that transmit a light component of yellow Y may be formed on the light receiving surface of the photodiode, which is a photoelectric conversion element, to obtain a color image having the above-mentioned pixel array. Here, the cyan C, the magenta M, and the yellow Y are complementary colors of three primary colors.

FIGS. 31 to 35 illustrate the aspects of pixel mixture in the image portion 41. The aspects of pixel mixture hold for the other image portions 42 to 44.

Figure 31:
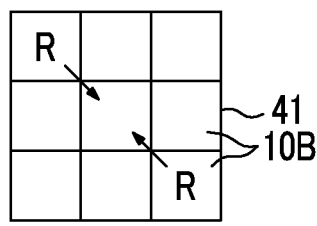
FIG. 31 illustrates an aspect of pixel mixture.

FIG. 31 illustrates the mixture of R pixels. For ease of understanding, pixels other than the R pixel are not illustrated in FIG. 31. In the image portion 41, the R pixels are arranged on the upper left side and the lower right side of a central pixel 10B. The two R pixels are mixed and averaged and the averaged pixel is an R mixed pixel after the image portion 41 is reduced.

Figure 32:
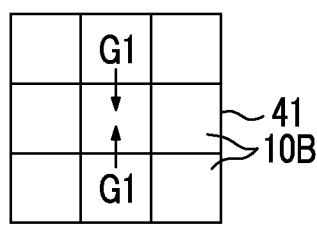
FIG. 32 illustrates an aspect of pixel mixture.

FIG. 32 illustrates the mixture of G1 pixels forming the image portion 41. In FIG. 32, letters indicating the colors of pixels other than the G1 pixels are not illustrated.

In the image portion 41, the G1 pixels are arranged on the upper and lower sides of a central pixel 10B. The two G1 pixels are mixed and averaged and the averaged pixel is a G1 mixed pixel after the image portion 41 is reduced.

Figure 33:
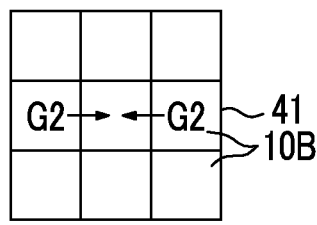
FIG. 33 illustrates an aspect of pixel mixture.

FIG. 33 illustrates the mixture of G2 pixels forming the image portion 41. In FIG. 33, letters indicating the colors of pixels other than the G2 pixels are not illustrated for ease of understanding.

In the image portion 41, the G2 pixels are arranged on the left and right sides of the central pixel 10B. The G2 pixels are mixed and averaged and the averaged pixel is a G2 mixed pixel after the image portion 41 is reduced.

Figure 34:
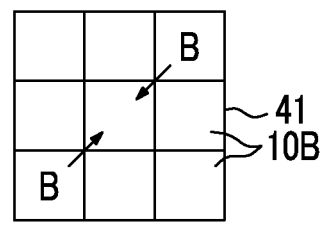
FIG. 34 illustrates an aspect of pixel mixture.

FIG. 34 illustrates B pixels forming the image portion 41. In FIG. 34, letters indicating the colors of pixels other than the B pixels are not illustrated.

The B pixels are arranged on the upper right side and the lower left side of a central pixel 10B. The two B pixels are mixed and averaged and the average pixel is a B mixed pixel after the image portion 41 is reduced.

Figure 35:
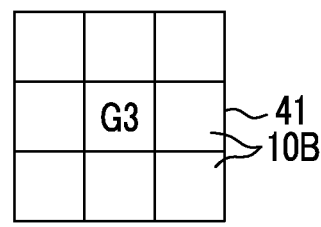
FIG. 35 illustrates an aspect of pixel mixture.

FIG. 35 illustrates G3 pixels forming the image portion 41. The G3 pixel at the center of the image portion 41 becomes a G3 mixed pixel. As such, pixel mixture is performed such that, after the pixels of each color are mixed, that is, green pixels, blue pixels, and red pixels are separately mixed, the centers of gravity of the mixed pixels of each color are located at the same pixel position. Since image reduction and pixel interpolation are simultaneously performed by the pixel mixture, it is possible to omit an interpolation process (also referred to as demosaic processing) which is generally performed as a separate process, to simplify the structure of a processing circuit, and to increase a processing speed.

Figure 36:
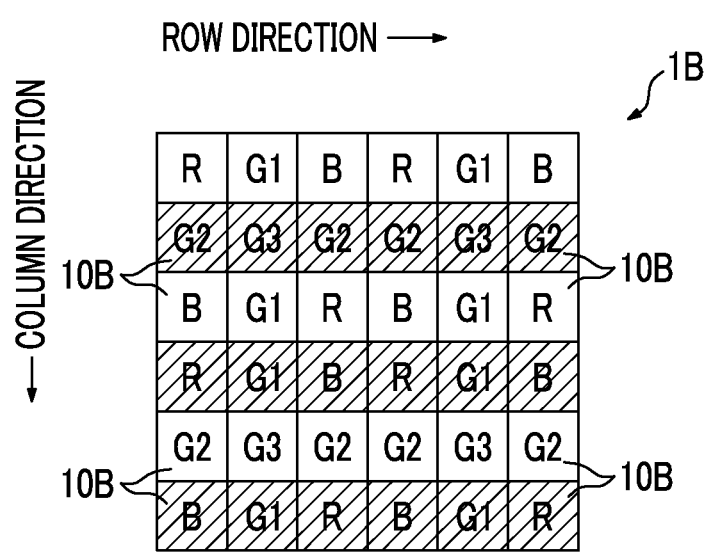
FIG. 36 illustrates a partial color image of horizontal stripes.

FIG. 36 corresponds to FIGS. 18 and 28 and illustrates a partial color image 1B of horizontal stripes.

Similarly to the partial color image illustrated in, for example, FIG. 18, it is assumed that an object is white and black horizontal stripes and the cycle of white and black is equal to the interval at which the photodiodes are formed in the imaging device. In this case, as illustrated in FIG. 36, the odd-numbered rows (or the even-numbered rows) are white lines and the even-numbered rows (or the odd-numbered rows) are black lines. In the partial color image 1B, the black line is hatched for ease of understanding. A portion which is not hatched indicates the white line.

Similarly to the description with reference to, for example, FIG. 18, when a G1 pixel, a G2 pixel, and a G3 pixel are mixed without being distinguished from each other, a false color is generated.

Figure 37:
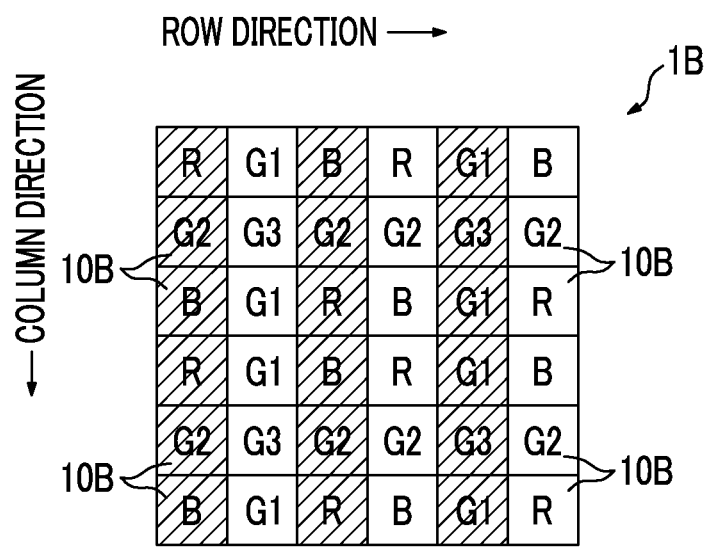
FIG. 37 illustrates a partial color image of vertical stripes.

FIG. 37 illustrates a partial color image 1B of vertical stripes.

Similarly to the partial color image illustrated in FIG. 36, it is assumed that an object is white and black vertical stripes and the cycle of white and black is equal to the interval at which the photodiodes are formed in the imaging device. In this case, as illustrated in FIG. 37, the odd-numbered columns (or the even-numbered columns) are white lines and the even-numbered columns (or the odd-numbered columns) are black lines. In FIG. 37, the black line is hatched for ease of understanding. A portion which is not hatched indicates the white line.

Figure 38:
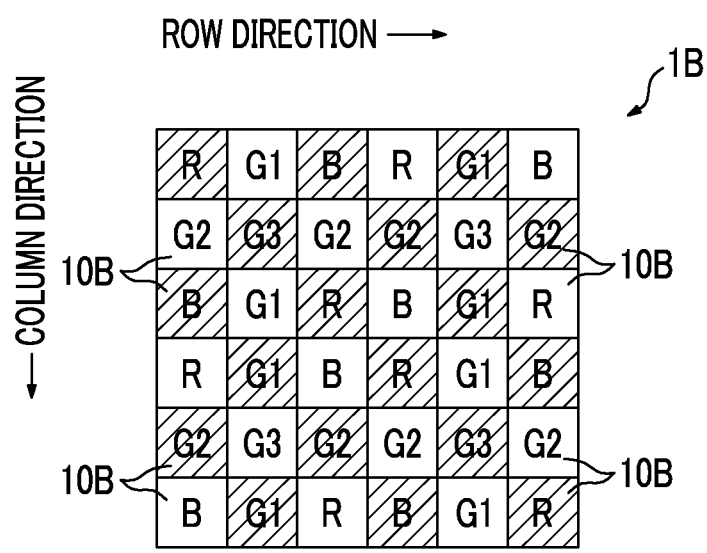
FIG. 38 illustrates a partial color image of oblique stripes.

FIG. 38 illustrates a partial color image 1B of oblique stripes.

Similarly to the partial color images illustrated in FIGS. 36 and 37, it is assumed that an object is white and black oblique stripes and the cycle of white and black is equal to the interval at which the photodiodes are formed in the imaging device. In this case, as illustrated in FIG. 38, oblique white and black lines alternately appear. In FIG. 38, the black is hatched for ease of understanding. A portion which is not hatched indicates white.

As illustrated in FIG. 36, in the case of the horizontal stripes, there is a correlation between the R pixel or the B pixel and the G1 pixel. As illustrated in FIG. 37, in the case of the vertical stripes, there is a correlation between the R pixel or the B pixel and the G2 pixel. As illustrated in FIG. 38, in the case of the oblique stripes, there is a correlation between the R pixel or the B pixel and the G3 pixel. Therefore, it is considered that, when the absolute value of the difference between the R pixel or the B pixel and the G1 pixel is a first absolute value, the absolute value of the difference between the R pixel or the B pixel and the G2 pixel is a second absolute value, and the absolute value of the difference between the R pixel or the B pixel and the G3 pixel is a third absolute value, the direction in which the absolute value is the smallest is the correlation direction in the image portion 41. It is considered that, when the first absolute value, the second absolute value, or the third absolute value is the smallest, the correlation direction is the horizontal direction, the vertical direction, or the oblique direction, respectively.

When the correlation direction is the horizontal direction, the R pixel difference value Rsub and the B pixel difference value Bsub are represented by Expression 18 and Expression 19, respectively.

$$R \text{ pixel difference value } R\text{sub} = R \text{ mixed pixel} - G1 \text{ mixed pixel} \qquad \text{Expression 18}$$

$$B \text{ pixel difference value } B\text{sub} = B \text{ mixed pixel} - G1 \text{ mixed pixel} \qquad \text{Expression 19}$$

When the correlation direction is the vertical direction, the R pixel difference value Rsub and the B pixel difference value Bsub are represented by Expression 20 and Expression 21, respectively.

$$R \text{ pixel difference value } R\text{sub} = R \text{ mixed pixel} - G2 \text{ mixed pixel} \qquad \text{Expression 20}$$

$$B \text{ pixel difference value } B\text{sub} = B \text{ mixed pixel} - G2 \text{ mixed pixel} \qquad \text{Expression 21}$$

When the correlation direction is the oblique direction, the R pixel difference value Rsub and the B pixel difference value Bsub are represented by Expression 22 and Expression 23, respectively.

$$R \text{ pixel difference value } R\text{sub} = R \text{ mixed pixel} - G3 \text{ mixed pixel} \qquad \text{Expression 22}$$

$$B \text{ pixel difference value } B\text{sub} = B \text{ mixed pixel} - G3 \text{ mixed pixel} \qquad \text{Expression 23}$$

Interpolation pixels are generated from, for example, the above-mentioned mixed pixels. It goes without saying that the R pixel difference value Rsub and the B pixel difference value Bsub corresponding to the correlation direction are used.

$$G \text{ interpolation pixel} = (G1 \text{ mixed pixel} + G2 \text{ mixed pixel} + G3 \text{ mixed pixel})/3 \qquad \text{Expression 24}$$

$$R \text{ interpolation pixel} = G \text{ interpolation pixel} + R \text{ pixel difference value } R\text{sub} \qquad \text{Expression 25}$$

$$B \text{ interpolation pixel} = G \text{ interpolation pixel} + B \text{ pixel difference value } B\text{sub} \qquad \text{Expression 26}$$

In this embodiment, similarly to the above-described embodiment, a reduced image is generated using the interpolation pixels obtained on the basis of Expressions 24 to 26. Therefore, as described above, even in a monochrome image of horizontal stripes, vertical stripes, or oblique stripes with a high frequency, it is possible to perform a reduction and interpolation process, without generating a false color.

FIGS. 39 to 44 illustrate another embodiment.

Figure 39:
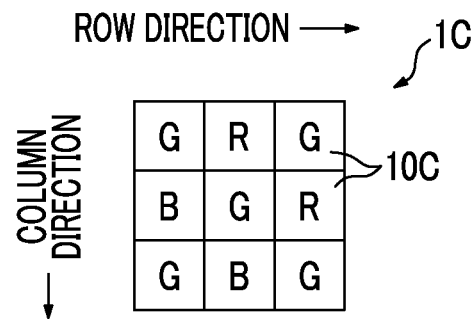
FIG. 39 illustrates an example of a partial color image.

FIG. 39 correspond to FIGS. 1, 21, and 30 and illustrates a partial color image 1C which is a portion of a color image obtained by an imaging device in which color filters are arranged in a predetermined array on light receiving surfaces of a plurality of photodiodes.

The partial color image 1C illustrated in FIG. 39 includes three pixels 10C in a row direction and three pixels 10C in a column direction. Similarly to the above, among the pixels 10C, a red pixel, a green pixel, and a blue pixel are represented by letters R, G, and B, respectively.

R pixels are arranged in a (3n+1)-th row and a (3n+2)-th column and in a (3n+2)-th row and a (3n+3)-th column. B pixels are arranged in a (3n+2)-th row and a (3n+1)-th column and in a (3n+3)-th row and a (3n+2)-th column. G pixels are arranged at the other positions. This basic array pattern is repeated to form a color image.

In the above-mentioned example, the red filter, the green filter, or the blue filter is formed on the light receiving surface of the photodiode, which is a photoelectric conversion element, to obtain a color image. However, a cyan filter having characteristics that transmit a light component of cyan C, a magenta filter having characteristics that transmit a light component of magenta M, or a yellow filter having characteristics that transmit a light component of yellow Y may be formed on the light receiving surface of the photodiode, which is a photoelectric conversion element, to obtain a color image having the above-mentioned pixel array. Here, the cyan C, the magenta M, and the yellow Y are complementary colors of three primary colors.

Figure 40:
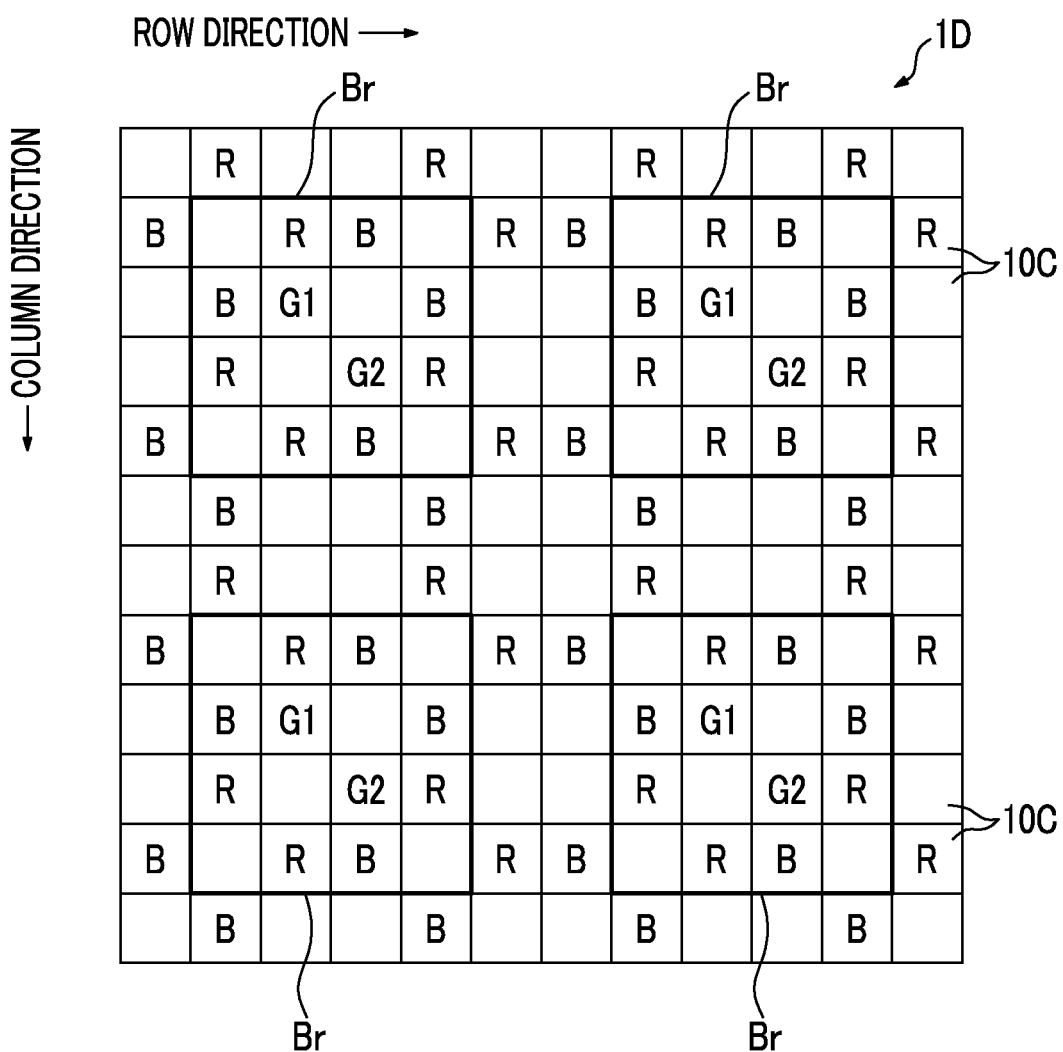
FIG. 40 illustrates an example of a partial color image.

FIG. 40 illustrates an example of a partial color image 1D formed by repeatedly arranging the partial color image 1C illustrated in FIG. 39 in the row direction and the column direction.

In FIG. 40, a G1 pixel (a first type of pixel of the first color) is arranged in a (6n+3)-th row and a (6n+3)-th column and a G2 pixel (a second type of pixel of the first color) is arranged in a (6n+4)-th row and a (6n+4)-th column. A G pixel is arranged in a blank portion of FIG. 40, as illustrated in FIG. 39. In FIG. 40, among the G pixels illustrated in FIG. 39, predetermined G pixels are defined as the G1 pixel and the G2 pixel. Only a B pixel is present and an R pixel is not present in the same row as the G1 pixel. Only the R pixel is present and the B pixel is not present in the same column as the G1 pixel. Only the R pixel is present and the B pixel is not present in the same row as the G2 pixel. Only the B pixel is present and the R pixel is not present in the same column as the G2 pixel.

A pixel mixture block Br includes four pixels in the horizontal direction and four pixels in the vertical direction, that is, a total of 16 pixels defined by (6n+2)-th to (6n+5)-th rows and (6n+2)-th to (6n+5)-th columns.

FIGS. 41 to 44 illustrate the R pixel, the B pixel, the G1 pixel, and the G2 pixel forming the pixel mixture block Br, respectively.

Figure 41:
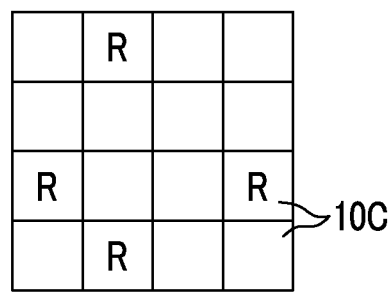
FIG. 41 illustrates R pixels.

FIG. 41 illustrates the R pixels forming an image portion of the pixel mixture block Br. In FIG. 41, letters indicating the colors of pixels other than the R pixels are not illustrated. A plurality of R pixels are mixed and averaged and the averaged pixel is an R mixed pixel after the image portion of the pixel mixture block Br is reduced.

Figure 42:
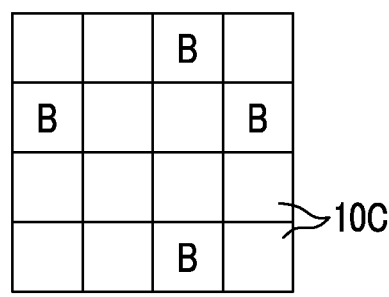
FIG. 42 illustrates B pixels.

FIG. 42 illustrates the B pixels forming the image portion of the pixel mixture block Br. In FIG. 42, letters indicating the colors of pixels other than the B pixels are not illustrated for ease of understanding. A plurality of B pixels are mixed and averaged and the averaged pixel is a B mixed pixel after the image portion of the pixel mixture block Br is reduced.

Figure 43:
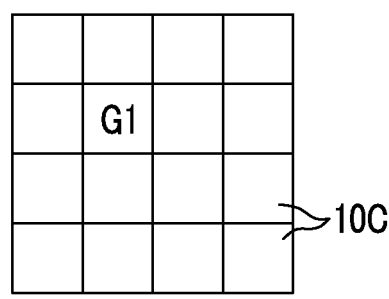
FIG. 43 illustrates a G1 pixel.

FIG. 43 illustrates the G1 pixel forming the image portion of the pixel mixture block Br. In FIG. 43, letters indicating the colors of pixels other than the G1 pixel are not illustrated. Since there is one G1 pixel in the pixel mixture block Br, the G1 pixel becomes a G1 mixed pixel.

Figure 44:
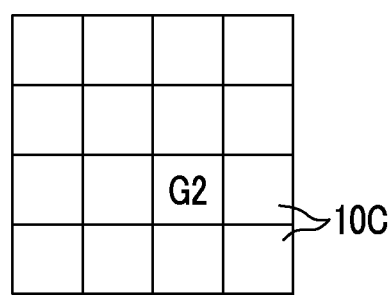
FIG. 44 illustrates a G2 pixel.

FIG. 44 illustrates the G2 pixel forming the image portion of the pixel mixture block Br. In FIG. 44, letters indicating the colors of pixels other than the G2 pixel are not illustrated. Since there is one G2 pixel in the pixel mixture block Br, the G2 pixel becomes a G2 mixed pixel.

In this embodiment, as described above, the correlation direction is determined using the R mixed pixel, the B mixed pixel, the G1 mixed pixel, and the G2 mixed pixel which are obtained by pixel mixture for each pixel mixture block Br. The correlation direction can be determined by the above-mentioned Expression 10A.

When Expression 10A is established, it is determined that the correlation direction is the horizontal direction in the image portion of the pixel mixture block Br. When Expression 10A is not established, it is determined that the correlation direction is the vertical direction in the image portion of the pixel mixture block Br.

When it is determined that the correlation direction is the horizontal direction, the R pixel difference value Rsub is calculated from Expression 13 and the B pixel difference value Bsub is calculated from Expression 14. When it is determined that the correlation direction is the vertical direction, the R pixel difference value Rsub is calculated from Expression 11 and the B pixel difference value Bsub is calculated from Expression 12.

A G interpolation pixel is obtained as an average value of eight G pixels (including the G1 pixel, the G2 pixel, and the G pixels indicated by the blank portions in the pixel mixture block Br illustrated in, for example, FIG. 40) included in the pixel mixture block Br from Expression 27. In addition, the G interpolation pixel may be calculated from Expression 15.

$$G \text{ interpolation pixel} = \Sigma G/8 \qquad \text{Expression 27}$$

An R interpolation pixel and a B interpolation pixel are obtained from Expression 16 and Expression 17, respectively.

In this embodiment, similarly to the above, it is possible to perform a reduction and interpolation process, without generating a false color. As can be seen from FIG. 40, the pixel mixture blocks Br do not come into contact with each other and adjacent pixel mixture blocks Br are separated from each other by two pixels. When reduction is performed as described above, the pixels between the pixel mixture blocks Br are ignored. Therefore, the number of pixels is reduced to 1/6 (an area ratio is reduced to 1/36) in the column direction and the row direction by the above-mentioned reduction process.

As such, in the embodiment of the invention, in the color image formed by repeatedly arranging the basic array pattern in the horizontal and vertical directions, the pixel mixture block Br (pixel mixture pattern) is set such that at least the G1 pixel (the first type of pixel of the first color) is arranged in the same row as the R pixel (the pixel of the second color) or the B pixel (the pixel of the third color) and the G2 pixel (the second type of pixel of the first color) different from the G1 pixel is arranged in the same column as the R pixel (the pixel of the second color) or the B pixel (the pixel of the third color). This means that, in the color image formed by repeatedly arranging the basic array pattern in the horizontal direction and the vertical direction, the pixel mixture block Br (pixel mixture pattern) is set such that the G1 pixel (the first type of pixel of the first color) is arranged only in the same row as at least the R pixel (the pixel of the second color) or the B pixel (the pixel of the third color) and the G2 pixel is arranged only in the same column as the R pixel (the pixel of the second color) or the B pixel (the pixel of the third color).

In the embodiment of the invention, in the set pixel mixture block Br, pixel mixture is performed for at least the first type of pixels of the first color (for example, the G1 pixels), the second type of pixels of the first color (for example, the G2 pixels), the pixels of the second colors (for example, the R pixels), and the pixels of the third color (for example, the B pixels).

In addition, it is determined whether the correlation direction is the column direction or the row direction in the color image, on the basis of a plurality of types of mixed pixels of the first color, a mixed pixel of the second color, and a mixed pixel of the third color obtained by the pixel mixture. Specifically, it is determined whether the correlation direction is the column direction or the row direction in the color image, on the basis of the comparison between a first correlation, which is the correlation among a mixed pixel of the pixel (the G1 pixel or the G2 pixel) of the first color arranged in the same row as the pixel (R pixel) of the second color, a mixed pixel of the second color, and a mixed pixel of the third color, and a second correlation, which is the correlation among a mixed pixel of the pixel (the G1 pixel or the G2 pixel) of the first color that is arranged in the same column as the pixel (R pixel) of the second color, a mixed pixel of the second color, and a mixed pixel of the pixel (the G1 pixel or the G2 pixel) of the first color that is arranged in the same column as the pixel (B pixel) of the third color.

In the embodiment of the invention, an interpolation pixel of the first color (G), an interpolation pixel of the second color (R), and an interpolation pixel of the third color (B) are generated for each pixel mixture pattern, on the basis of the determination result, using a plurality of types of mixed pixels of the first color (G1 or G2), the mixed pixel of the second color (R), and the mixed pixel of the third color (B). Therefore, even when an object image with a high spatial frequency is input, the generation of a false color in a reduced image obtained by pixel mixture is prevented.

In the above-described embodiment, the filters of each color are formed on the light receiving surfaces of the photodiodes, which are photoelectric conversion elements, to obtain a color image. However, the invention is not limited thereto. For example, a color image may be obtained from an imaging device which uses photoelectric conversion elements using an organic material and in which a photodiode converts a specific color component of incident light into an electric signal.

Figure 45:
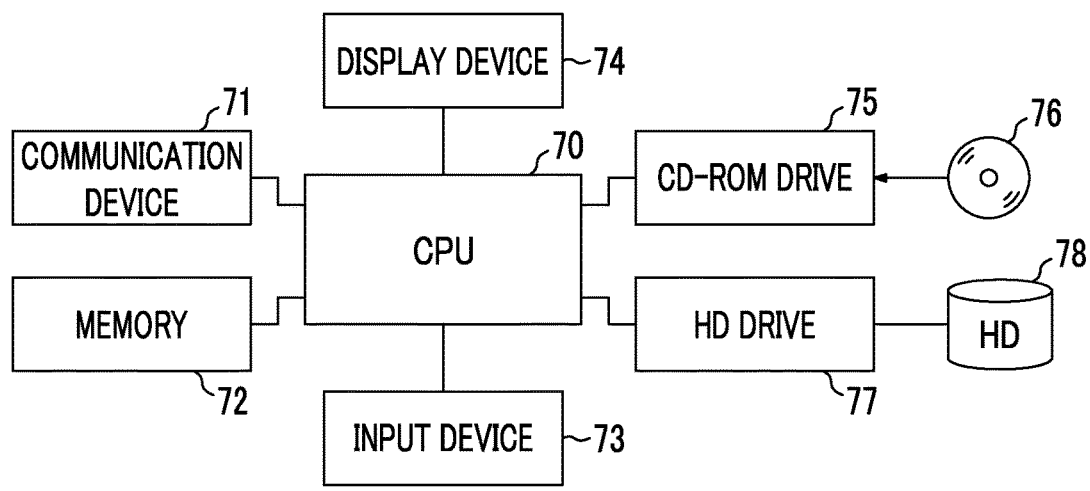
FIG. 45 is a block diagram illustrating the electrical structure of a personal computer.
Figure 46:
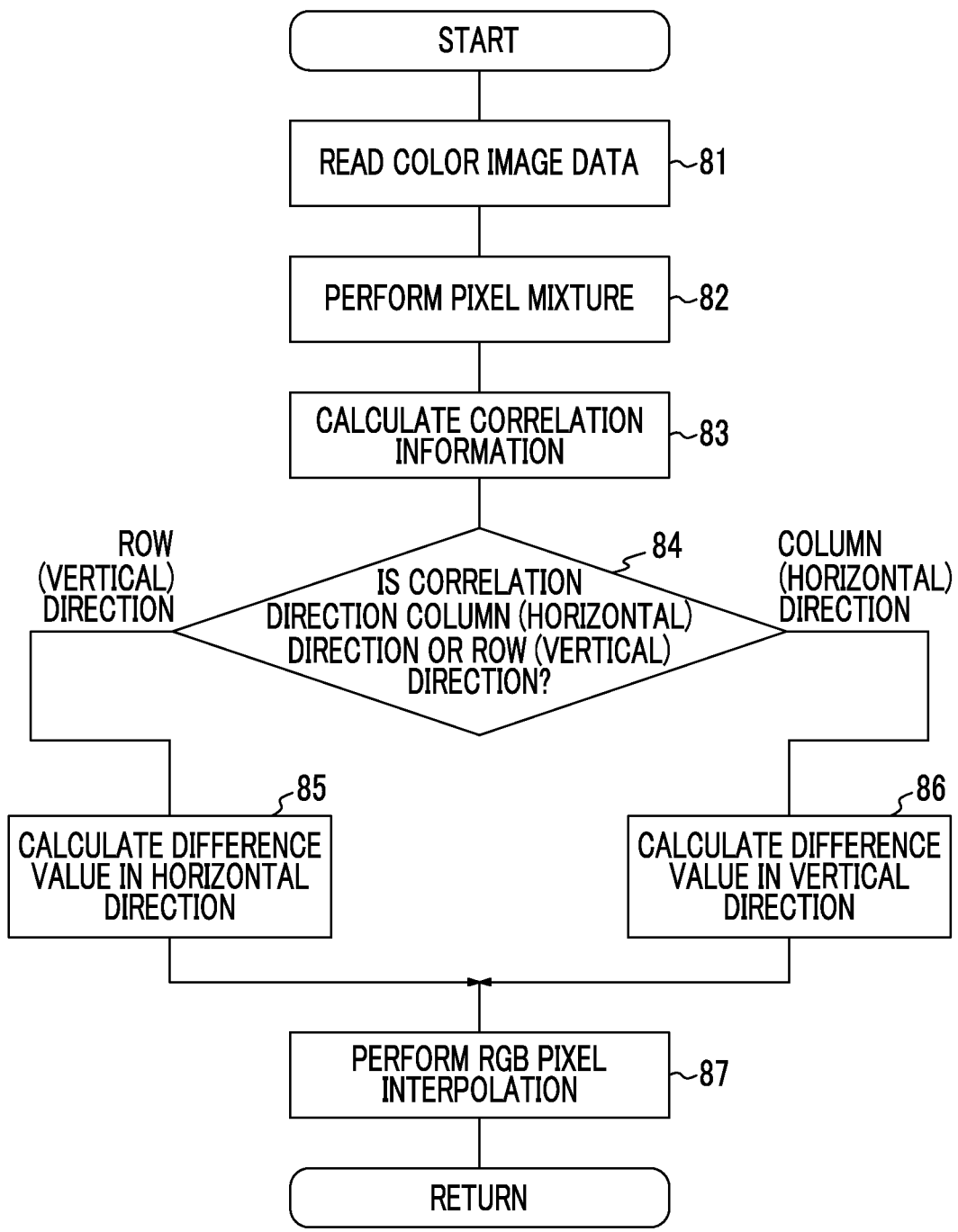
FIG. 46 is a flowchart illustrating the procedure of a process of the personal computer.

FIGS. 45 and 46 illustrate another embodiment.

FIG. 45 is a block diagram illustrating the electrical structure of a personal computer.

A CPU 70 controls the overall operation of the personal computer.

A communication device 71, a memory 72, an input device 73, such as a keyboard, and a display device 74 are connected to the CPU 70. In addition, the personal computer includes a hard disk 78, a hard disk drive 77 that accesses the hard disk 78, and a compact disk-read only memory (CD-ROM) drive 75.

A CD-ROM 76 which stores a program for performing the above-mentioned process is inserted into the CD-ROM drive 75 and the program is read from the CD-ROM 76. The read program is installed in the personal computer and the above-mentioned process is performed. The program may not be stored in the CD-ROM 76. The communication device 71 may receive the program transmitted through a network and the program may be installed in the personal computer.

FIG. 46 is a flowchart illustrating the procedure of the process of the personal computer illustrated in FIG. 45.

As described above, color image data captured by the imaging device is recorded on the hard disk 78 and the color image data is read from the hard disk 78 (Step 81). The following process is performed for each pixel mixture block Br in the read color image data.

As described above, the pixels of the same color are mixed with each other (Step 82). However, as described above, it goes without saying that the pixel mixture is performed for the Gr pixels, the Gb pixels, the G1 pixels, the G2 pixels, and the G3 pixels such that different types of pixels are not mixed with each other.

Then, as described above, correlation information indicating the correlation direction is calculated (Step 83). As described above, the correlation information indicating the correlation direction is calculated by, for example, Expression 1.

The correlation direction is determined on the basis of the correlation information (Step 84). When the correlation direction is the column direction (horizontal direction), the R pixel difference value Rsub and the B pixel difference value Bsub corresponding to the horizontal direction are calculated as described above (Step 85). When the correlation direction is the row direction (vertical direction), the R pixel difference value Rsub and the B pixel difference value Bsub corresponding to the vertical direction are calculated (Step 86).

As described above, the interpolation pixels are generated using the calculated R pixel difference value Rsub and B pixel difference value Bsub (Step 87).

The digital camera and the personal computer have been described above as the embodiment of the imaging apparatus according to the invention. However, the structure of the imaging apparatus is not limited thereto. Other imaging apparatuses according to the embodiments of the invention may be, for example, a built-in or external PC camera and a portable terminal apparatus with an imaging function, which will be described below.

Examples of the portable terminal apparatus, which is an embodiment of the imaging apparatus according to the invention, include a mobile phone, a smart phone, a personal digital assistant (PDA), and a portable game machine. Hereinafter, the smart phone will be described in detail as an example with reference to the drawings.

Figure 47:
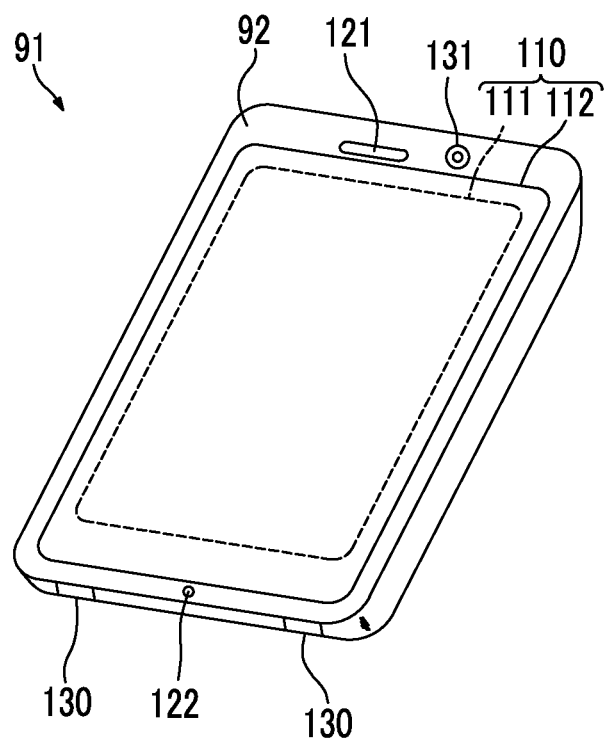
FIG. 47 illustrates the outward appearance of a smart phone.

FIG. 47 illustrates the outward appearance of a smart phone 91 which is an embodiment of the imaging apparatus according to the invention. The smart phone 91 illustrated in FIG. 47 includes a housing 92 with a flat plate shape and a display input unit 100 having a display panel 111 as a display unit and an operation panel 112 as an input unit which are integrally formed on one surface of the housing 92. The housing 92 includes a microphone 122, a speaker 121, an operating unit 130, and a camera unit 131. However, the structure of the housing 92 is not limited thereto. For example, the display unit and the input unit may be independently provided or the housing 92 may have a folding structure or a sliding mechanism.

Figure 48:
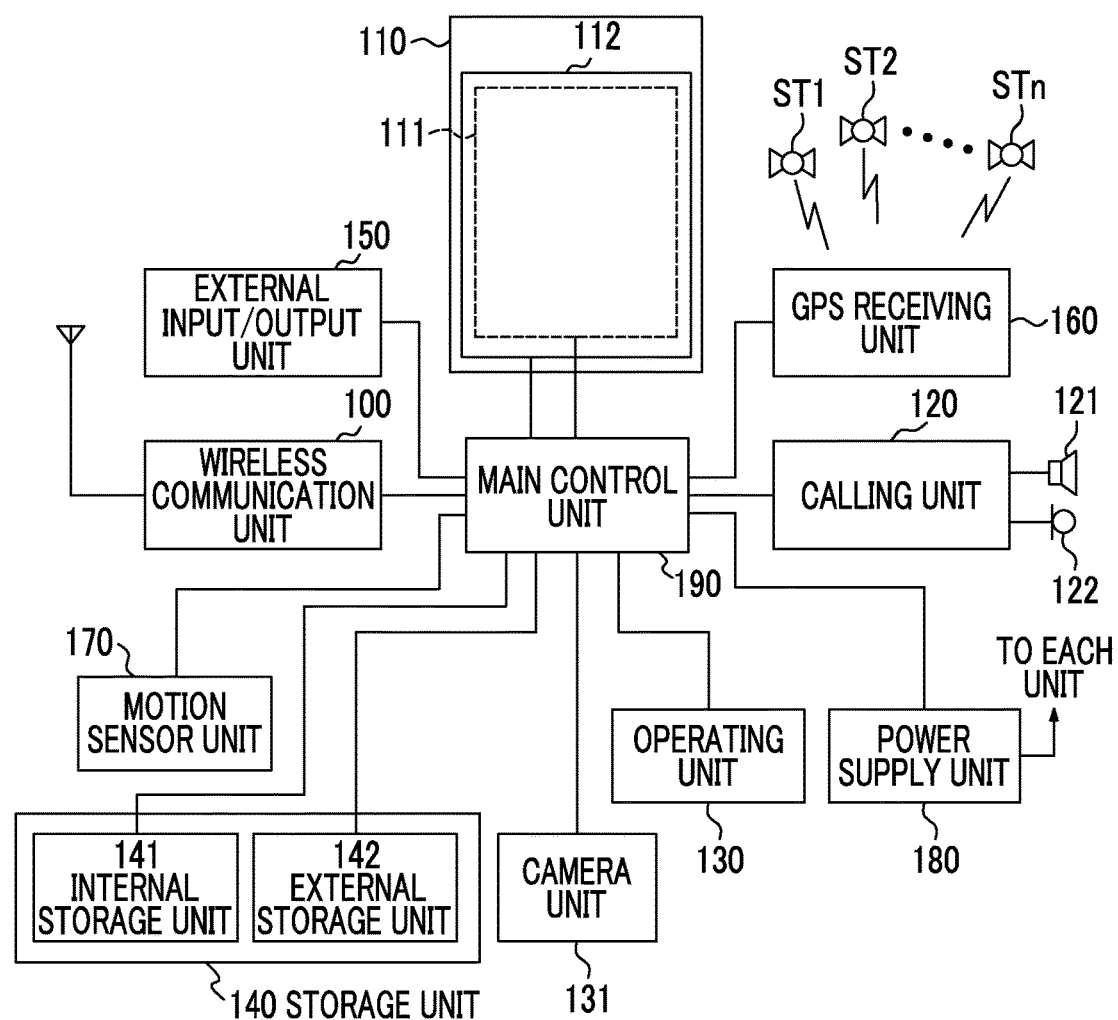
FIG. 48 is a block diagram illustrating the electrical structure of a smart phone.

FIG. 48 is a block diagram illustrating the structure of the smart phone 91 illustrated in FIG. 47. As illustrated in FIG. 48, the smart phone includes, as main components, a wireless communication unit 100, the display input unit 110, a calling unit 120, the operating unit 130, the camera unit 131, a storage unit 140, an external input/output unit 150, a global positioning system (GPS) receiving unit 160, a motion sensor unit 170, a power supply unit 180, and a main control unit 190. The smart phone 91 has, as a main function, a wireless communication function which performs mobile wireless communication through a base station apparatus BS and a mobile communication network NW.

The wireless communication unit 100 performs wireless communication with the base station apparatus BS which is accommodated in the mobile communication network NW in response to an instruction from the main control unit 190. The wireless communication is used to transmit and receive various types of file data, such as voice data and image data, and electronic mail data or to receive, for example, web data and streaming data.

The display input unit 110 is a so-called touch panel which displays, for example, images (still images and moving images) or text information to visually transmit information to the user and detects a user's operation for the displayed information, under the control of the main control unit 190, and includes the display panel 111 and the operation panel 112.

The display panel 111 uses, for example, a liquid crystal display (LCD) or an organic electro-luminescence display (OELD) as a display device. The operation panel 112 is a device that is provided such that an image displayed on a display surface of the display panel 111 is visually recognized and detects one or a plurality of coordinates operated by a finger of the user or a stylus. When the device is operated by a finger of the user or a stylus, a detection signal which is generated by the operation is output to the main control unit 190. Then, the main control unit 190 detects an operation position (coordinates) on the display panel 111 on the basis of the received detection signal.

As illustrated in FIG. 47, the display panel 111 and the operation panel 112 of the smart phone 91, which is an embodiment of the imaging apparatus according to the invention, are integrated to form the display input unit 110 and the operation panel 112 is arranged so as to completely cover the display panel 111. When this arrangement is used, the operation panel 112 may have a function of detecting the user's operation in a region other than the display panel 111. In other words, the operation panel 112 may include a detection region (hereinafter, referred to as a display region) for an overlap portion which overlaps the display panel 111 and a detection region (hereinafter, referred to as a non-display region) for an outer edge portion which does not overlap the display panel 111.

The size of the display region may be exactly equal to the size of the display panel 111. However, the sizes are not necessarily equal to each other. The operation panel 112 may include two sensitive regions, that is, an outer edge portion and an inner portion other than the outer edge portion. The width of the outer edge portion is appropriately designed according to, for example, the size of the housing 92. Examples of a position detecting method which is used in the operation panel 112 include a matrix switching method, a resistive layer method, a surface elastic wave method, an infrared method, an electromagnetic induction method, and a capacitive sensing method. Any method may be used.

The calling unit 120 includes the speaker 121 and the microphone 122. The calling unit 120 converts the voice of the user which is input through the microphone 122 into voice data which can be processed by the main control unit 190 and outputs the converted voice data to the main control unit 190. In addition, the calling unit 120 decodes voice data received by the wireless communication unit 100 or the external input/output unit 150 and outputs the decoded voice data from the speaker 121. As illustrated in FIG. 47, for example, the speaker 121 can be mounted on the same surface as the display input unit 110 and the microphone 122 can be mounted on a side surface of the housing 92.

The operating unit 130 is a hardware key which uses, for example, a key switch and receives instructions from the user. For example, as illustrated in FIG. 47, the operating unit 130 is a push button switch which is mounted on the side surface of the housing 92 of the smart phone 91, is turned on when it is pressed by, for example, a finger, and is turned off by the restoring force of a spring when the finger is taken off.

The storage unit 140 stores a control program or control data of the main control unit 190, application software, address data which is associated with, for example, the names or phone numbers of communication partners, transmitted and received electronic mail data, web data which is downloaded by web browsing, or downloaded content data. In addition, the storage unit 140 temporarily stores, for example, streaming data. The storage unit 140 includes an internal storage unit 141 which is provided in the smart phone and an external storage unit 142 which has a detachable external memory slot. The internal storage unit 141 and the external storage unit 142 forming the storage unit 140 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 150 functions as an interface with all external apparatuses which are connected to the smart phone 91 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB (registered trademark)) network, or a ZigBee (registered trademark) network).

Examples of the external apparatus connected to the smart phone 91 include a wired/wireless headset, a wired/wireless external charger, a wired/wireless data port, and a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit can transmit data which is received from the external apparatus to each component of the smart phone 91 or can transmit data in the smart phone 91 to the external apparatus.

The GPS receiving unit 160 receives GPS signals transmitted from GPS satellites ST1 to STn and performs a position measurement process on the basis of the plurality of received GPS signals to detect a position including the latitude, longitude, and height of the smart phone 91, in response to an instruction from the main control unit 190. When the GPS receiving unit 160 can acquire positional information from the wireless communication unit 100 or the external input/output unit 150 (for example, the wireless LAN), it can detect the position using the positional information.

The motion sensor unit 170 includes, for example, a triaxial acceleration sensor and detects the physical movement of the smart phone 91 in response to an instruction from the main control unit 190. The moving direction or acceleration of the smart phone 91 is detected by the detected physical movement of the smart phone 91. The detection result is output to the main control unit 190.

The power supply unit 180 supplies power which is stored in a battery (not illustrated) to each unit of the smart phone 91 in response to an instruction from the main control unit 190.

The main control unit 190 includes a microprocessor, operates on the basis of the control program or control data recorded in the storage unit 140, and controls the overall operation of each unit of the smart phone 91. The main control unit 190 has an application processing function and a mobile communication control function of controlling each unit of a communication system in order to perform voice communication or data communication through the wireless communication unit 100.

The application processing function is implemented by the operation of the main control unit 190 based on the application software which is stored in the storage unit 140. Examples of the application processing function include an infrared communication function which controls the external input/output unit 150 such that data communication with an opposing apparatus is performed, an electronic mail function which transmits and receives electronic mail, and a web browsing function which browses web pages.

The main control unit 190 has, for example, an image processing function which displays an image on the display input unit 110 on the basis of image data (still image or moving image data) such as received data or downloaded streaming data. The image processing function means the function of the main control unit 190 decoding the image data, performing image processing on the decoding result, and displaying the image on the display input unit 110.

The main control unit 190 performs display control for the display panel 111 and operation detection control which detects the operation of the user through the operating unit 130 and the operation panel 112.

The main control unit 190 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 111.

The main control unit 190 performs the operation detection control to detect the operation of the user input through the operating unit 130, to receive an operation for the icon or the input of a character string to an input field of the window through the operation panel 112, or to receive a request to scroll the displayed image through the scroll bar.

In addition, the main control unit 190 performs the operation detection control to determine whether the position of an operation for the operation panel 112 is an overlap portion (display region) which overlaps the display panel 111 or an outer edge portion (non-display region) which does not overlap the display panel 111 other than the overlap portion. The main control unit 190 has a touch panel control function which controls a sensitive region of the operation panel 112 or the display position of the software key.

The main control unit 190 can detect a gesture operation for the operation panel 112 and perform a predetermined function according to the detected gesture operation. The gesture operation does not mean a simple touch operation of the related art, but means an operation which draws a trace using a finger, an operation which designates a plurality of positions at the same time, or a combination thereof which draws a trace for at least one of the plurality of positions.

The camera unit 131 is a digital camera which electronically captures an image using an imaging element, such as a complementary metal oxide semiconductor (CMOS)

image sensor or a charge-coupled device (CCD). The camera unit 131 converts captured image data into image data which is compressed in, for example, a joint photographic coding experts group (JPEG) format under the control of the main control unit 190 and stores the converted image data in the storage unit 140 or outputs the converted image data through the input/output unit 150 or the wireless communication unit 100. As illustrated in FIG. 47, the camera unit 131 is mounted on the same surface as the display input unit 110 in the smart phone 91. However, the mounting position of the camera unit 131 is not limited thereto. For example, the camera unit 131 may be mounted on the rear surface of the display input unit 110 or a plurality of camera units 131 may be mounted. When the plurality of camera units 131 are mounted, the camera units 131 which are used to capture images may be switched such that a single camera unit captures images or the plurality of camera units 131 may be simultaneously used to capture images.

The camera unit 131 can be used for various functions of the smart phone 91. For example, the image captured by the camera unit 131 can be displayed on the display panel 111 or the image captured by the camera unit 131 can be used as one of the operation inputs of the operation panel 112. When the GPS receiving unit 160 detects the position, the position may be detected with reference to the image from the camera unit 131. In addition, the optical axis direction of the camera unit 131 in the smart phone 91 may be determined or the current usage environment may be determined, with reference to the image from the camera unit 131, using the triaxial acceleration sensor or without using the triaxial acceleration sensor. Of course, the image from the camera unit 131 may be used in the application software.

For example, various kinds of information, such as the positional information which is acquired by the GPS receiving unit 160, the voice information which is acquired by the microphone 122 (for example, the main control unit may convert the voice information into text information using voice-text conversion), and the posture information acquired by the motion sensor unit 170, may be added to the image data of a still image or a moving image and the image data may be stored in the storage unit 140 or may be output through the external input/output unit 150 or the wireless communication unit 100.

In the above-described embodiment, the centers of gravity of the mixed pixels are located at the same position in the pixel mixture block Br.

What is claimed is:

1. A pixel interpolation device comprising:
   a same-color pixel mixture device for, in a color image in which a basic array pattern including a pixel of a first color and pixels of second and third colors having a lower contribution to brightness than the pixel of the first color is repeatedly arranged in a row direction and a column direction, mixing the pixels of the first color such that at least a first type of pixels of the first color which are arranged in the same row as the pixel of the second color or the pixel of the third color and a second type of pixels of the first color which are different from the first type of pixels of the first color and are arranged in the same column as the pixel of the second color or the pixel of the third color are separately mixed with each other in a pixel mixture block and for separately mixing the pixels of the second color and the pixels of the third color in the pixel mixture block such that a process of mixing the pixels of the same color is performed for each pixel mixture pattern having a plurality of pixels in the row direction and the column direction, thereby obtaining a plurality of types of mixed pixels of the first color, a mixed pixel of the second color, and a mixed pixel of the third color for each pixel mixture pattern;
   a correlation determination device for determining whether a correlation direction is the column direction or the row direction in the color image, on the basis of the plurality of types of mixed pixels of the first color obtained by the same-color pixel mixture device; and
   an interpolation device for generating an interpolation pixel of the first color, an interpolation pixel of the second color, and an interpolation pixel of the third color for each pixel mixture pattern, using the plurality of types of mixed pixels of the first color, the mixed pixel of the second color, and the mixed pixel of the third color obtained by the same-color pixel mixture device, on the basis of the determination result of the correlation determination device.

2. The pixel interpolation device according to claim 1, wherein, when the correlation determination device determines that the correlation direction is the column direction in the color image, the interpolation device reduces the influence of the pixel of the first color, which is arranged in the same row as the pixel of the second color, on the pixel of the second color and reduces the influence of the pixel of the first color, which is arranged in the same row as the pixel of the third color, on the pixel of the third color, and
when the correlation determination device determines that the correlation direction is the row direction in the color image, the interpolation device reduces the influence of the pixel of the first color, which is arranged in the same column as the pixel of the second color, on the pixel of the second color, reduces the influence of the pixel of the first color, which is arranged in the same column as the pixel of the third color, on the pixel of the third color, and generates the interpolation pixel of the first color, the interpolation pixel of the second color, and the interpolation pixel of the third color for each pixel mixture pattern, using the plurality of types of mixed pixels of the first color, the mixed pixel of the second color, and the mixed pixel of the third color obtained by the same-color pixel mixture device.

3. The pixel interpolation device according to claim 2, wherein the interpolation device includes difference data calculation device for calculating difference data for the second color between the mixed pixel of the second color and the mixed pixel of the first color which is present in the correlation direction determined by the correlation determination device among the plurality of types of mixed pixels of the first color and difference data for the third color between the mixed pixel of the third color and the mixed pixel of the first color which is present in the correlation direction determined by the correlation determination device among the plurality of types of mixed pixels of the first color, and
an average pixel of the plurality of types of pixels of the first color is the interpolation pixel of the first color, a pixel obtained by adding the difference data for the second color calculated by the difference data calculation device to the interpolation pixel of the first color is the interpolation pixel of the second color, and a pixel obtained by adding the difference data for the third color calculated by the difference data calculation device to the interpolation pixel of the first color is the interpolation pixel of the third color.

4. The pixel interpolation device according to claim 2, further comprising:
  added value determination device for determining the larger of a first added value obtained by adding an absolute value of a difference between the mixed pixel of the second color and the mixed pixel of the first color which is arranged in the same column as the second color among the plurality of types of mixed pixels of the first color and an absolute value of a difference between the mixed pixel of the third color and the mixed pixel of the first color which is arranged in the same column as the third color among the plurality of types of mixed pixels of the first color and a second added value obtained by adding an absolute value of a difference between the mixed pixel of the second color and the mixed pixel of the first color which is arranged in the same row as the second color among the plurality of types of mixed pixels of the first color and an absolute value of a difference between the mixed pixel of the third color and the mixed pixel of the first color which is arranged in the same row as the third color among the plurality of types of mixed pixels of the first color,
  wherein the correlation determination device determines that the correlation direction is the column direction when the added value determination device determines that the first added value is less than the second added value and determines that the correlation direction is the row direction when the added value determination device determines that the first added value is greater than the second added value.

5. The pixel interpolation device according to claim 2, wherein two types of mixed pixels of the first color are obtained by the same-color pixel mixture device.

6. The pixel interpolation device according to claim 2, wherein the centers of gravity of the plurality of types of mixed pixels of the first color, the mixed pixel of the second color, and the mixed pixel of the third color obtained by the same-color pixel mixture device are located at the same position in the pixel mixture pattern.

7. The pixel interpolation device according to claim 1, wherein the interpolation device includes difference data calculation device for calculating difference data for the second color between the mixed pixel of the second color and the mixed pixel of the first color which is present in the correlation direction determined by the correlation determination device among the plurality of types of mixed pixels of the first color and difference data for the third color between the mixed pixel of the third color and the mixed pixel of the first color which is present in the correlation direction determined by the correlation determination device among the plurality of types of mixed pixels of the first color, and
  an average pixel of the plurality of types of pixels of the first color is the interpolation pixel of the first color, a pixel obtained by adding the difference data for the second color calculated by the difference data calculation device to the interpolation pixel of the first color is the interpolation pixel of the second color, and a pixel obtained by adding the difference data for the third color calculated by the difference data calculation device to the interpolation pixel of the first color is the interpolation pixel of the third color.

8. The pixel interpolation device according to claim 7, further comprising:
  added value determination device for determining the larger of a first added value obtained by adding an absolute value of a difference between the mixed pixel of the second color and the mixed pixel of the first color which is arranged in the same column as the second color among the plurality of types of mixed pixels of the first color and an absolute value of a difference between the mixed pixel of the third color and the mixed pixel of the first color which is arranged in the same column as the third color among the plurality of types of mixed pixels of the first color and a second added value obtained by adding an absolute value of a difference between the mixed pixel of the second color and the mixed pixel of the first color which is arranged in the same row as the second color among the plurality of types of mixed pixels of the first color and an absolute value of a difference between the mixed pixel of the third color and the mixed pixel of the first color which is arranged in the same row as the third color among the plurality of types of mixed pixels of the first color,
  wherein the correlation determination device determines that the correlation direction is the column direction when the added value determination device determines that the first added value is less than the second added value and determines that the correlation direction is the row direction when the added value determination device determines that the first added value is greater than the second added value.

9. The pixel interpolation device according to claim 7, wherein two types of mixed pixels of the first color are obtained by the same-color pixel mixture device.

10. The pixel interpolation device according to claim 7, wherein the centers of gravity of the plurality of types of mixed pixels of the first color, the mixed pixel of the second color, and the mixed pixel of the third color obtained by the same-color pixel mixture device are located at the same position in the pixel mixture pattern.

11. The pixel interpolation device according to claim 1, further comprising:
  added value determination device for determining the larger of a first added value obtained by adding an absolute value of a difference between the mixed pixel of the second color and the mixed pixel of the first color which is arranged in the same column as the second color among the plurality of types of mixed pixels of the first color and an absolute value of a difference between the mixed pixel of the third color and the mixed pixel of the first color which is arranged in the same column as the third color among the plurality of types of mixed pixels of the first color and a second added value obtained by adding an absolute value of a difference between the mixed pixel of the second color and the mixed pixel of the first color which is arranged in the same row as the second color among the plurality of types of mixed pixels of the first color and an absolute value of a difference between the mixed pixel of the third color and the mixed pixel of the first color which is arranged in the same row as the third color among the plurality of types of mixed pixels of the first color,
  wherein the correlation determination device determines that the correlation direction is the column direction when the added value determination device determines that the first added value is less than the second added value and determines that the correlation direction is the row direction when the added value determination device determines that the first added value is greater than the second added value.

12. The pixel interpolation device according to claim 11, wherein two types of mixed pixels of the first color are obtained by the same-color pixel mixture device.

13. The pixel interpolation device according to claim 1, wherein two types of mixed pixels of the first color are obtained by the same-color pixel mixture device.

14. The pixel interpolation device according to claim 1, wherein the centers of gravity of the plurality of types of mixed pixels of the first color, the mixed pixel of the second color, and the mixed pixel of the third color obtained by the same-color pixel mixture device are located at the same position in the pixel mixture pattern.

15. The pixel interpolation device according to claim 1, wherein the basic array pattern is based on a Bayer array.

16. The pixel interpolation device according to claim 1, wherein 6×6 pixels are arranged in the row direction and the column direction,
the 6×6 pixels include the pixel of the first color having a green or magenta color component, the pixel of the second color having a red or cyan color component, and the pixel of the third color having a blue or yellow color component in the row direction and the column direction, and
the 6×6 pixels include at least one pixel of the first color in the column direction, the row direction, and an oblique direction and include at least one portion in which two consecutive pixels of the first color are arranged in the column direction, the row direction, and the oblique direction.

17. The pixel interpolation device according to claim 1, wherein, in the color image, the pixel of the first color is arranged in the same row and column as the pixel of the second color and is arranged in the same column and row as the pixel of the third color.

18. An imaging apparatus comprising:
the pixel interpolation device according to claim 1.

19. A method for controlling an operation of a pixel interpolation device comprising:
allowing a same-color pixel mixture device to, in a color image in which a basic array pattern including a pixel of a first color and pixels of second and third colors having a lower contribution to brightness than the pixel of the first color is repeatedly arranged in a row direction and a column direction, mix the pixels of the first color such that at least a first type of pixels of the first color which are arranged in the same row as the pixel of the second color or the pixel of the third color and a second type of pixels of the first color which are different from the first type of pixels of the first color and are arranged in the same column as the pixel of the second color or the pixel of the third color are separately mixed with each other in a pixel mixture block and to separately mix the pixels of the second color and the pixels of the third color in the pixel mixture block such that a process of mixing the pixels of the same color is performed for each pixel mixture pattern having a plurality of pixels in the row direction and the column direction, thereby obtaining a plurality of types of mixed pixels of the first color, a mixed pixel of the second color, and a mixed pixel of the third color for each pixel mixture pattern;
allowing a correlation determination device to determine whether a correlation direction is the column direction or the row direction in the color image, on the basis of the plurality of types of mixed pixels of the first color obtained by the same-color pixel mixture device; and
allowing an interpolation device to generate an interpolation pixel of the first color, an interpolation pixel of the second color, and an interpolation pixel of the third color for each pixel mixture pattern, using the plurality of types of mixed pixels of the first color, the mixed pixel of the second color, and the mixed pixel of the third color obtained by the same-color pixel mixture device, on the basis of the determination result of the correlation determination device.

20. A non-transitory recording medium storing a computer-readable program that controls a computer of a pixel interpolation device so as to perform:
in a color image in which a basic array pattern including a pixel of a first color and pixels of second and third colors having a lower contribution to brightness than the pixel of the first color is repeatedly arranged in a row direction and a column direction, mixing the pixels of the first color such that at least a first type of pixels of the first color which are arranged in the same row as the pixel of the second color or the pixel of the third color and a second type of pixels of the first color which are different from the first type of pixels of the first color and are arranged in the same column as the pixel of the second color or the pixel of the third color are separately mixed with each other in a pixel mixture block, and separately mixing the pixels of the second color and the pixels of the third color in the pixel mixture block such that a process of mixing the pixels of the same color is performed for each pixel mixture pattern having a plurality of pixels in the row direction and the column direction, thereby obtaining a plurality of types of mixed pixels of the first color, a mixed pixel of the second color, and a mixed pixel of the third color for each pixel mixture pattern;
determining whether a correlation direction is the column direction or the row direction in the color image, on the basis of the obtained plurality of types of mixed pixels of the first color; and
generating an interpolation pixel of the first color, an interpolation pixel of the second color, and an interpolation pixel of the third color for each pixel mixture pattern, using the obtained plurality of types of mixed pixels of the first color, the obtained mixed pixel of the second color, and the obtained mixed pixel of the third color, on the basis of the determination result of the correlation.

* * * * *